(12) United States Patent
Hwang et al.

(10) Patent No.: US 8,121,431 B2
(45) Date of Patent: Feb. 21, 2012

(54) METHOD AND APPARATUS FOR DETECTING EDGE OF IMAGE AND COMPUTER READABLE MEDIUM PROCESSING METHOD

(75) Inventors: Young Bae Hwang, Daejeon (KR); Jun Sik Kim, Seoul (KR); In So Kweon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1120 days.

(21) Appl. No.: 11/924,414

(22) Filed: Oct. 25, 2007

(65) Prior Publication Data
US 2008/0170796 A1 Jul. 17, 2008

(30) Foreign Application Priority Data
Jan. 15, 2007 (KR) .................. 10-2007-0004262

(51) Int. Cl.
*G06K 9/40* (2006.01)

(52) U.S. Cl. ....................... 382/266; 382/199

(58) Field of Classification Search .................. 382/199, 382/266
See application file for complete search history.

(56) References Cited

U.S. PATENT DOCUMENTS

| 7,676,111 | B2* | 3/2010 | Yamauchi | 382/275 |
| 2005/0243205 | A1* | 11/2005 | Wredenhagen et al. | 348/448 |
| 2006/0165292 | A1* | 7/2006 | Li | 382/199 |
| 2007/0110319 | A1* | 5/2007 | Wyatt et al. | 382/199 |
| 2007/0147697 | A1* | 6/2007 | Lee et al. | 382/260 |

OTHER PUBLICATIONS

Lim "Characterization of Noise in Digital Photographs for Image Processing" SPIE Proceedings 6069, Digital Photography II, Jan. 23, 2006.*

* cited by examiner

*Primary Examiner* — Stephen Koziol

(57) ABSTRACT

The present invention provides a method and apparatus for detecting a noise distribution of an image close to a true distribution, and detecting an edge of the image precisely and quickly based on the detected noise distribution without performing a smoothing process for the image, and a computer readable medium processing the method. The method of detecting an edge of an image includes the steps of: detecting a noise distribution of an object image; and detecting an edge of the image based on the detected noise distribution.

14 Claims, 24 Drawing Sheets

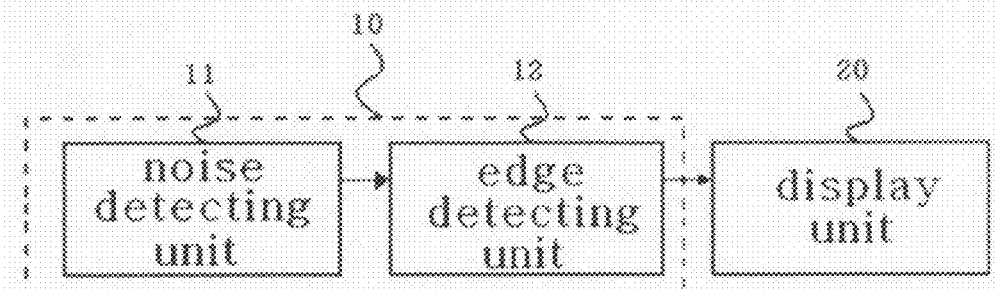
[Fig 1]
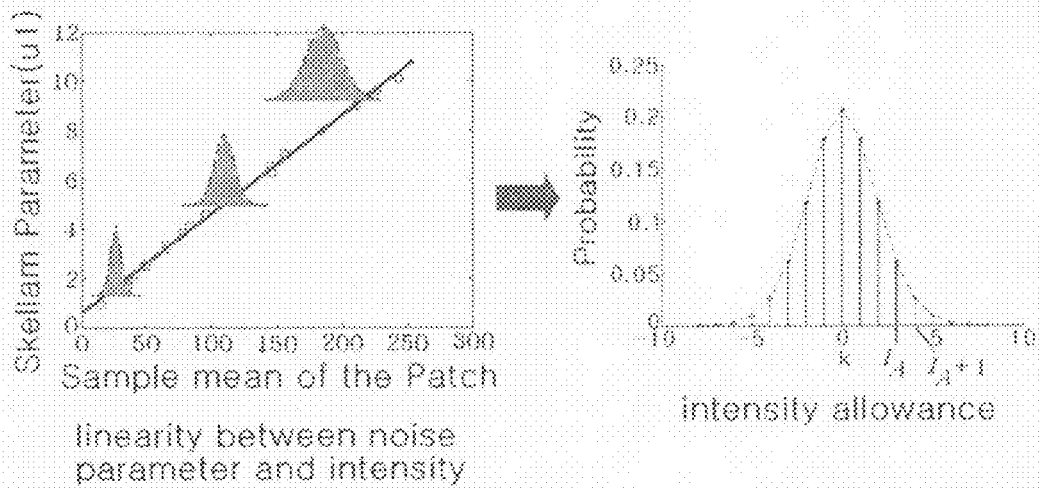
[Fig 2a]
linearity between noise parameter and intensity
intensity allowance

[Fig 2b]
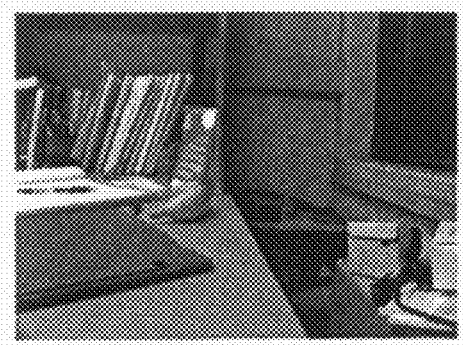  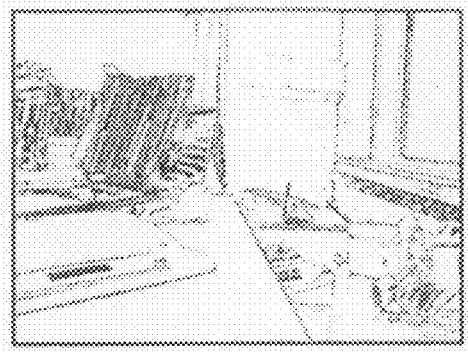
input image → detected edge
[Fig 3]
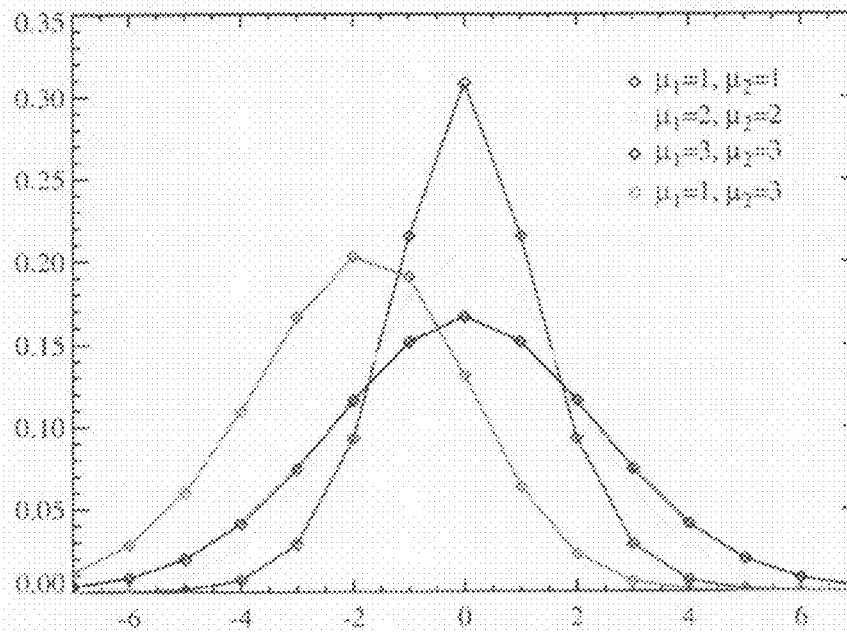

[Fig 4a]
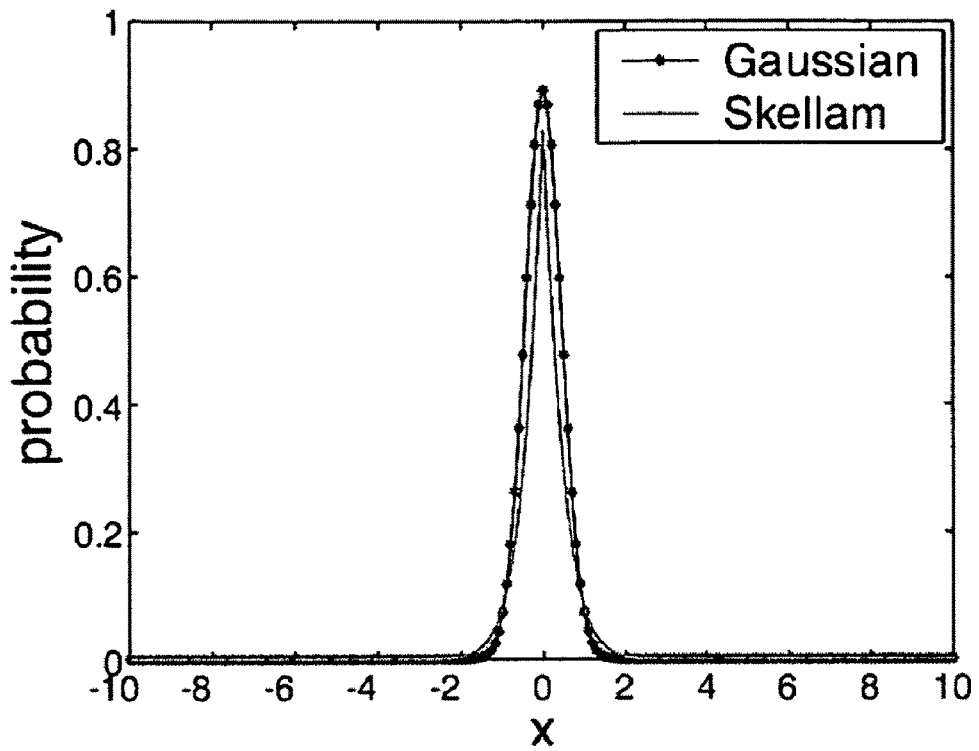
[Fig 4b]
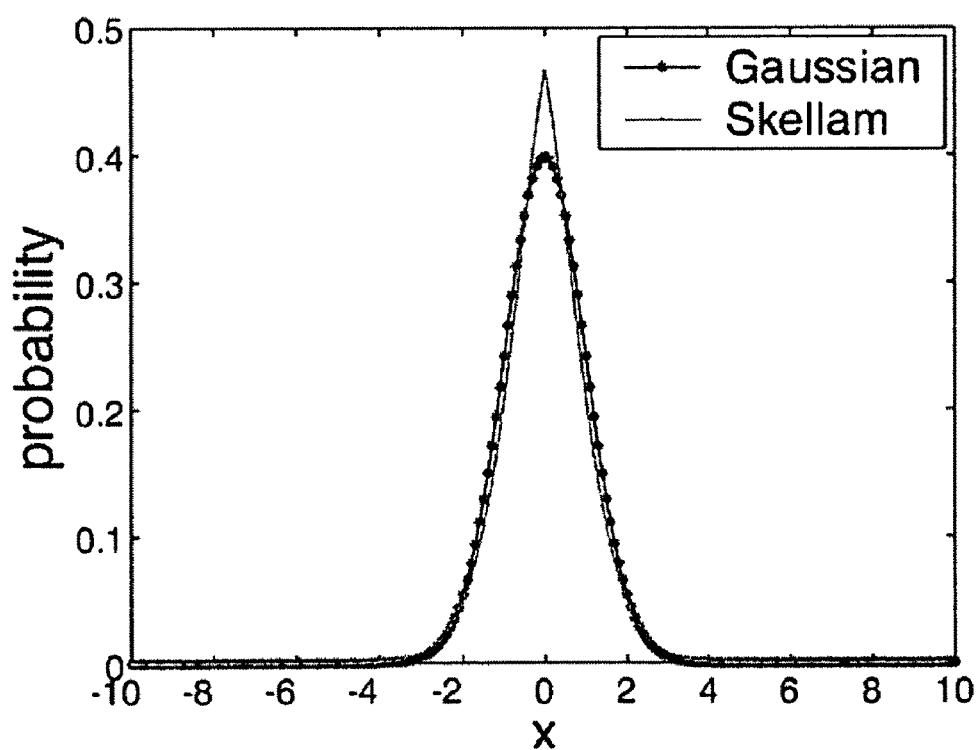

[Fig 4c]
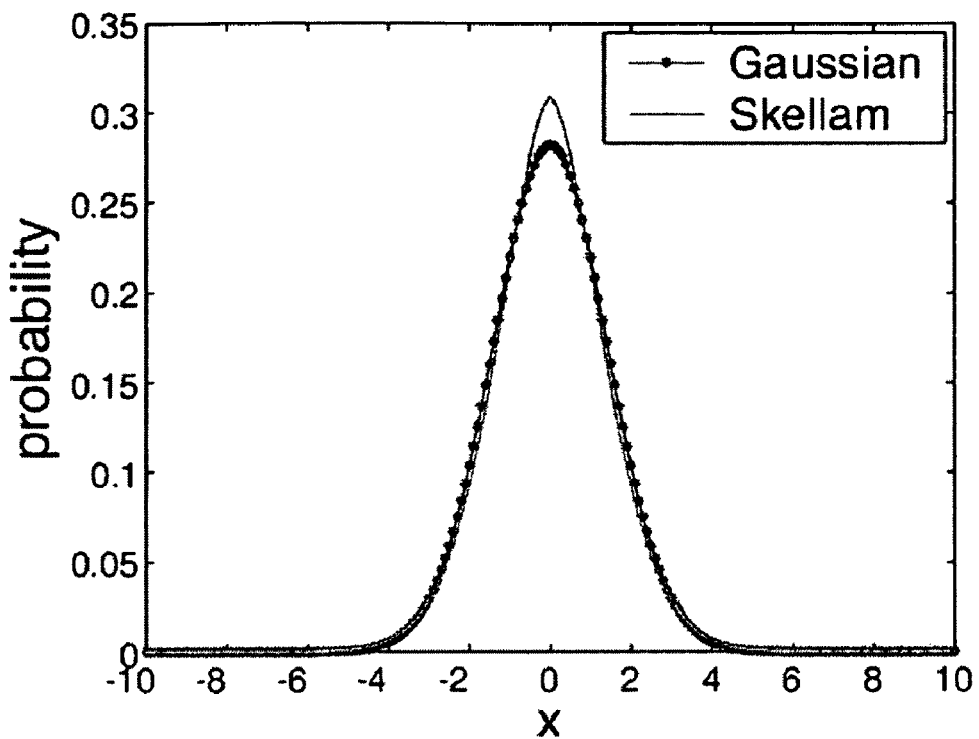
[Fig 4d]
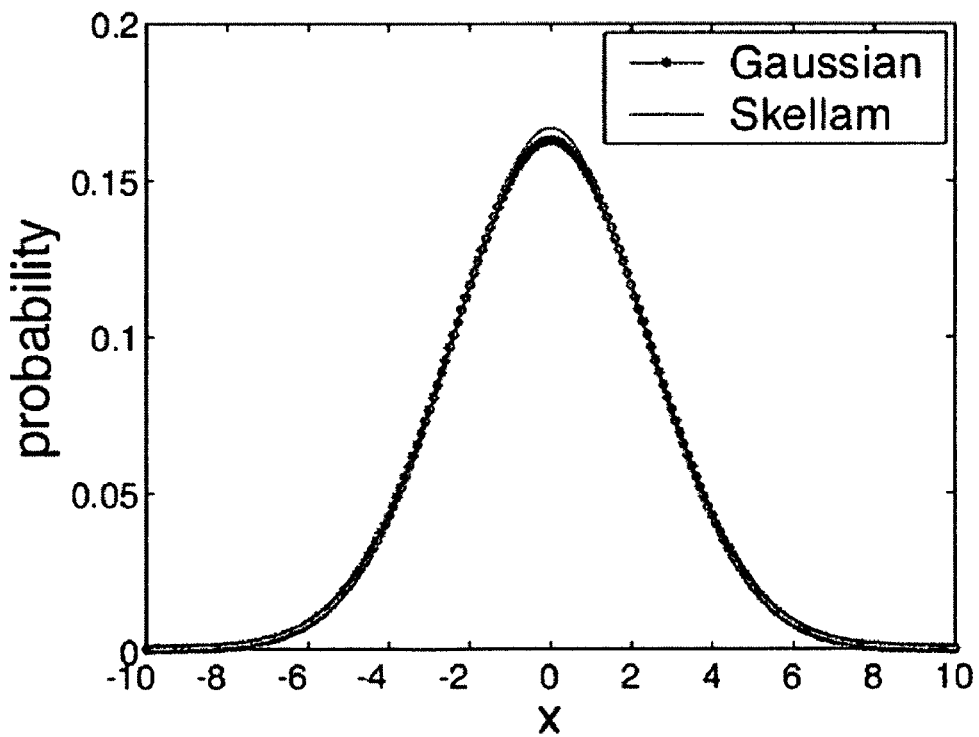

[Fig 5a]
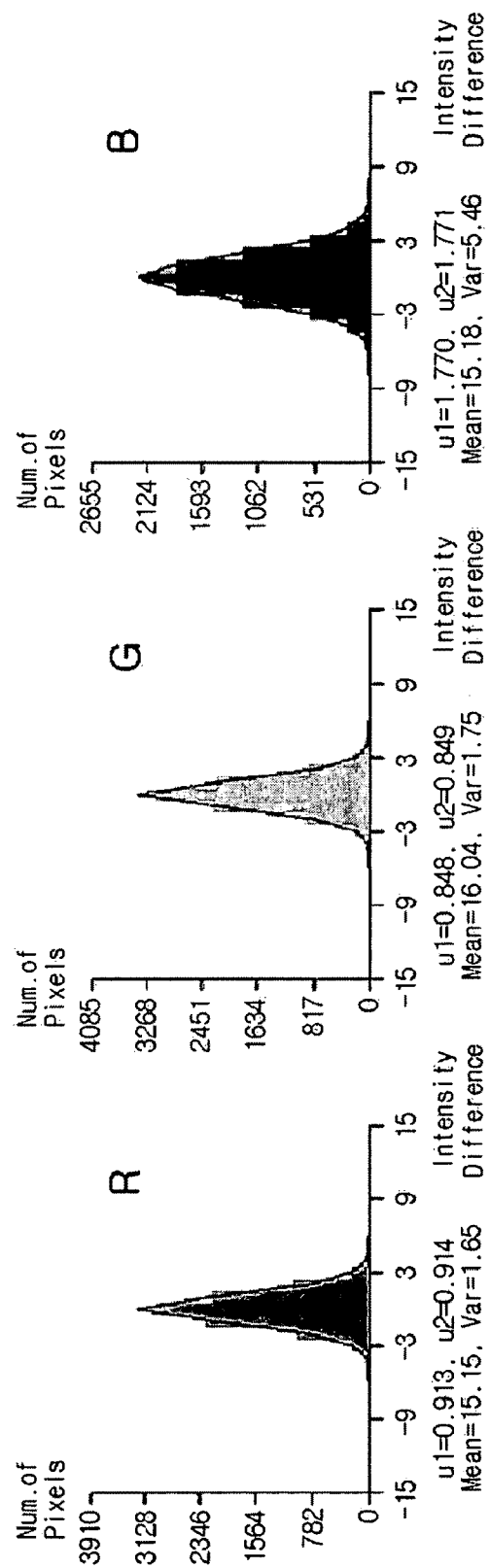

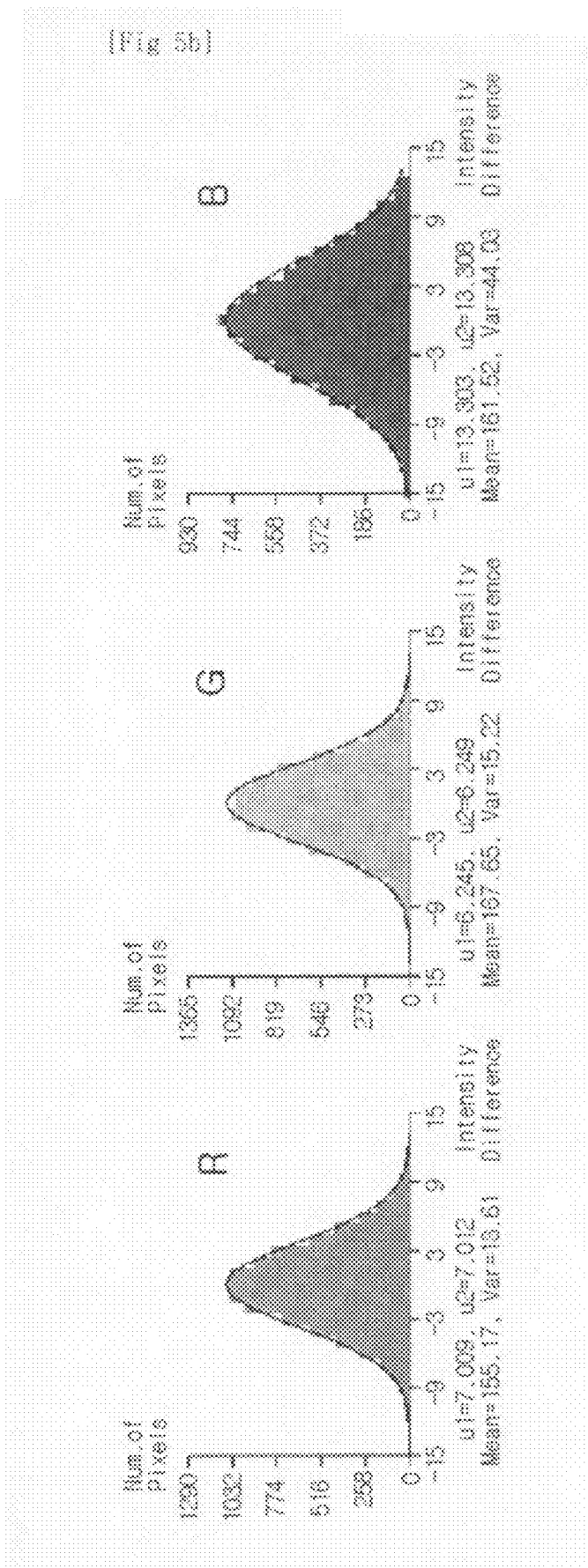

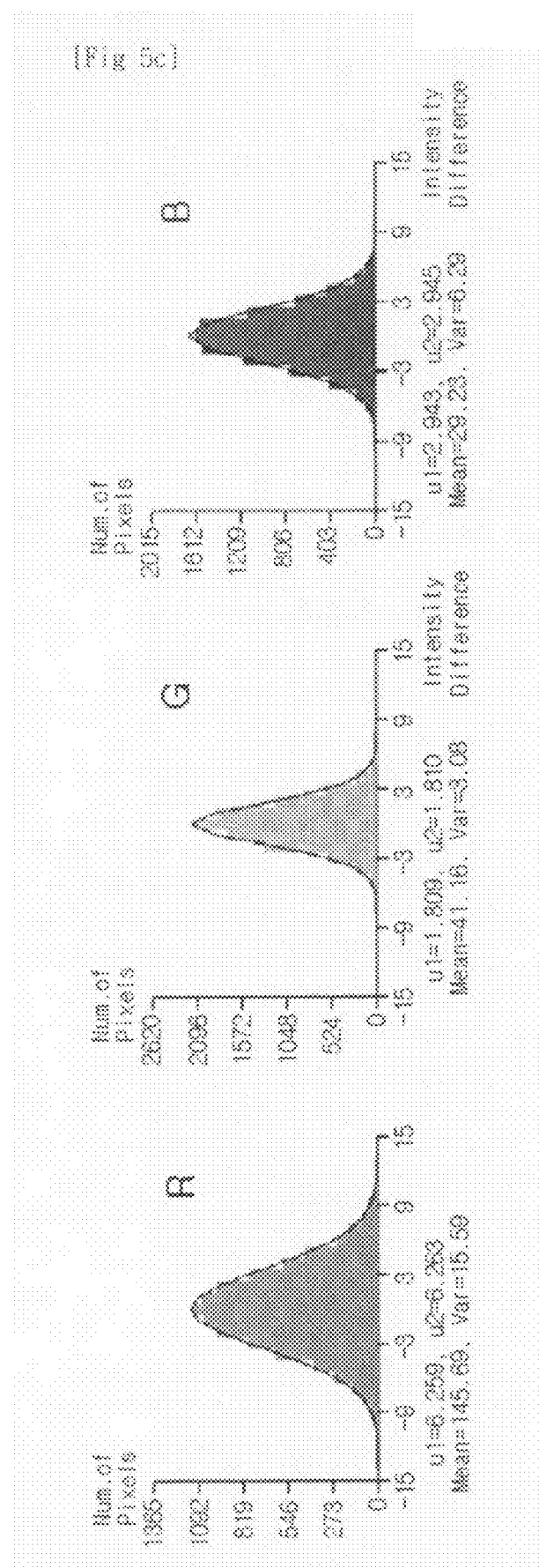

[Fig 6a]
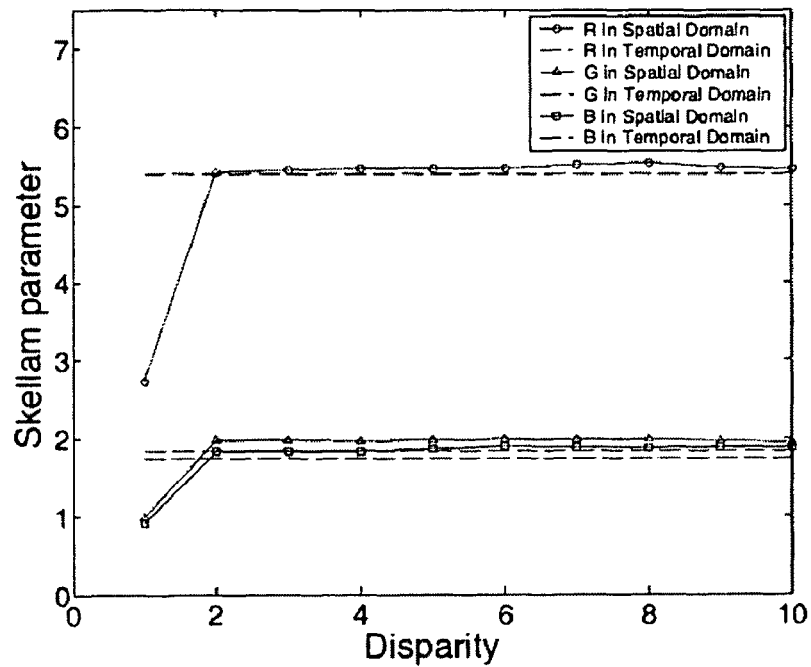
[Fig 6b]
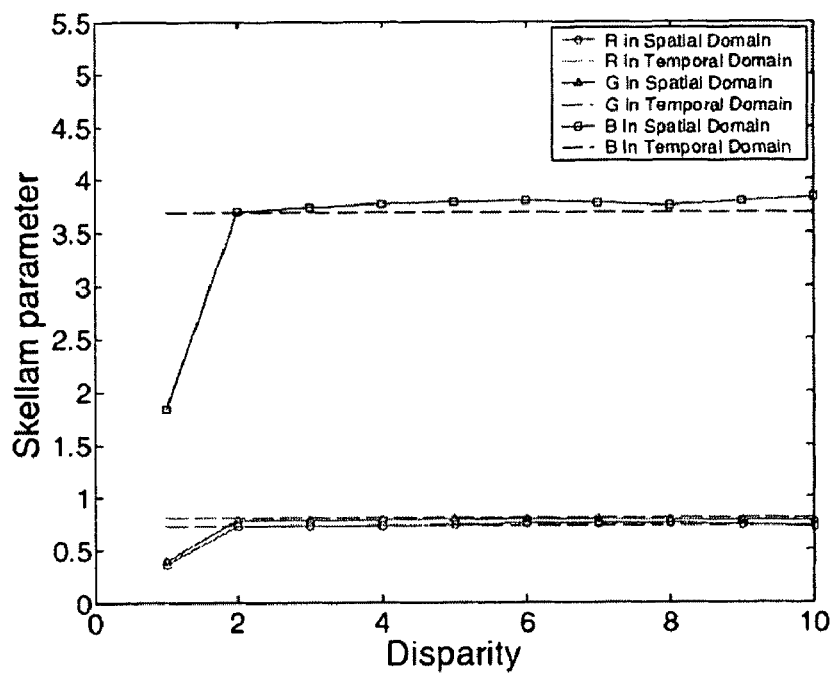

[Fig 6c]
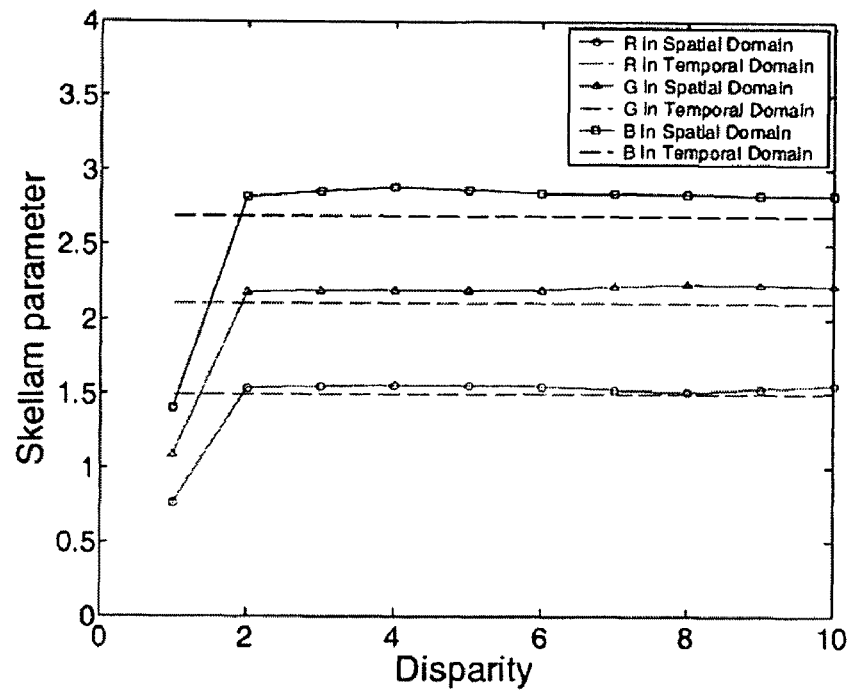
[Fig 6d]
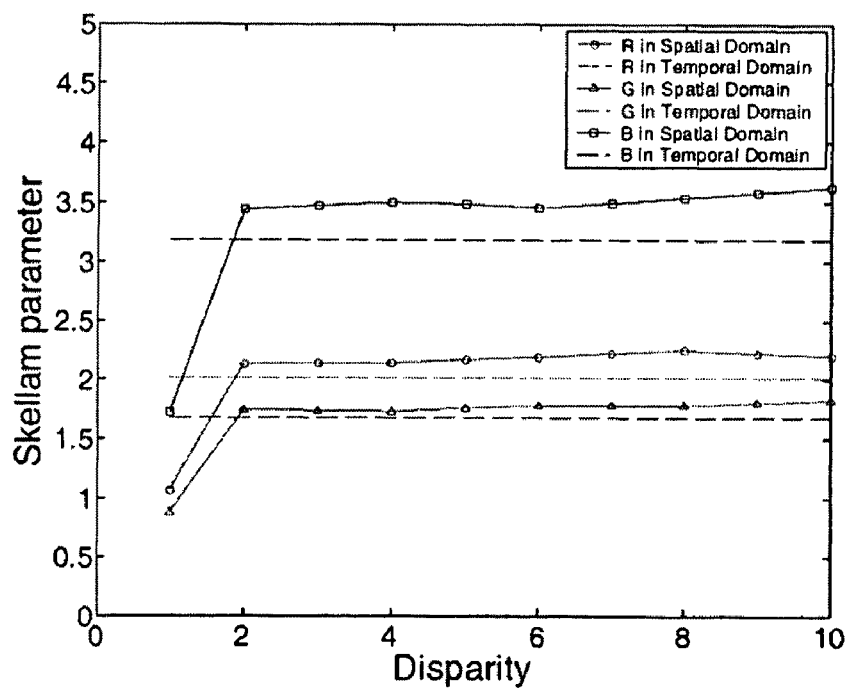

[Fig 7a]
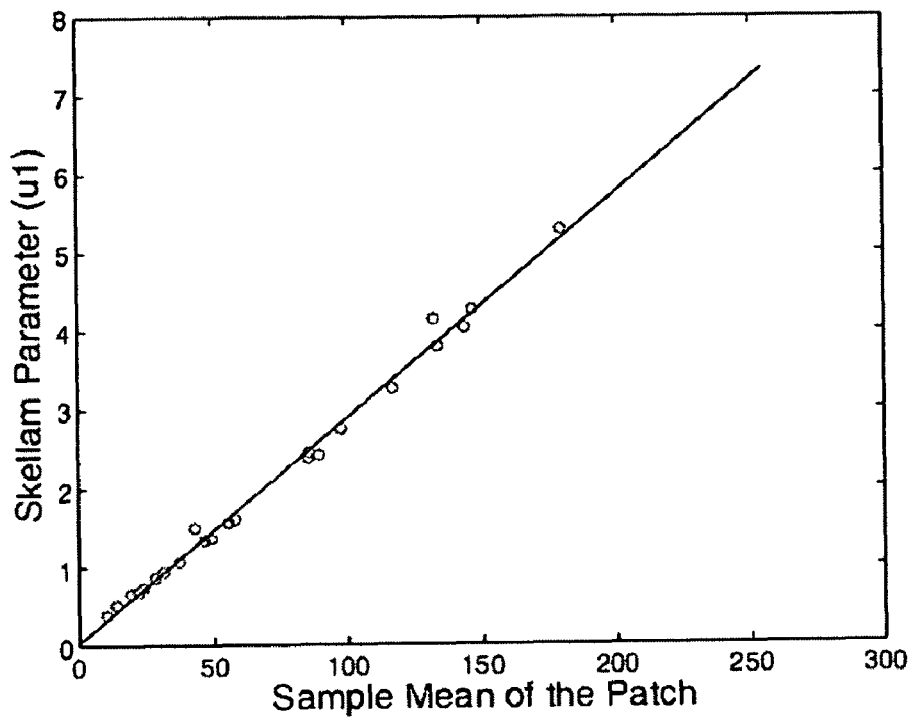
[Fig 7b]
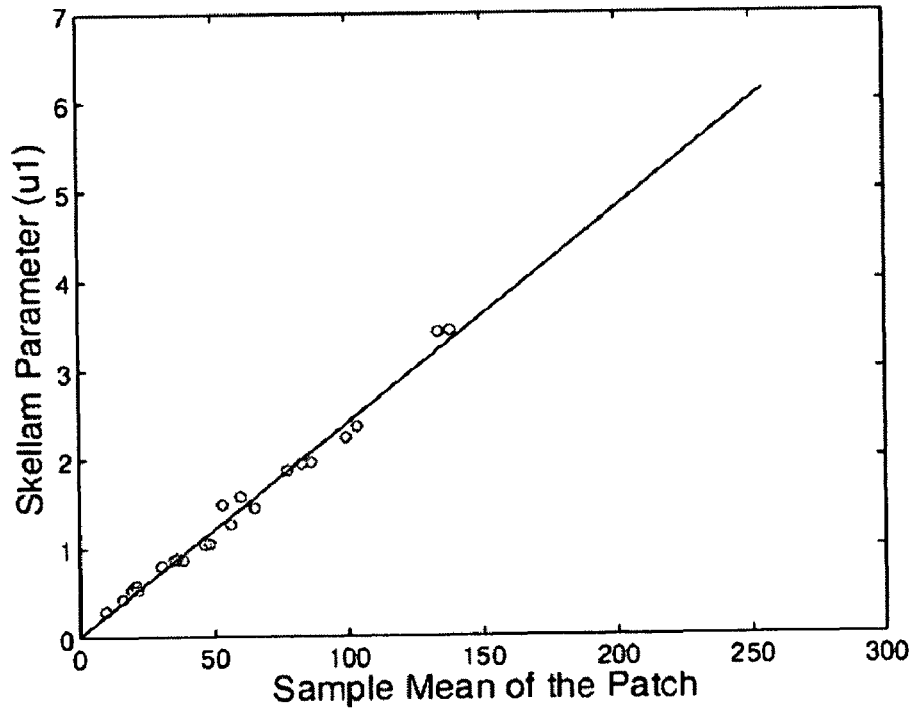

[Fig 7c]
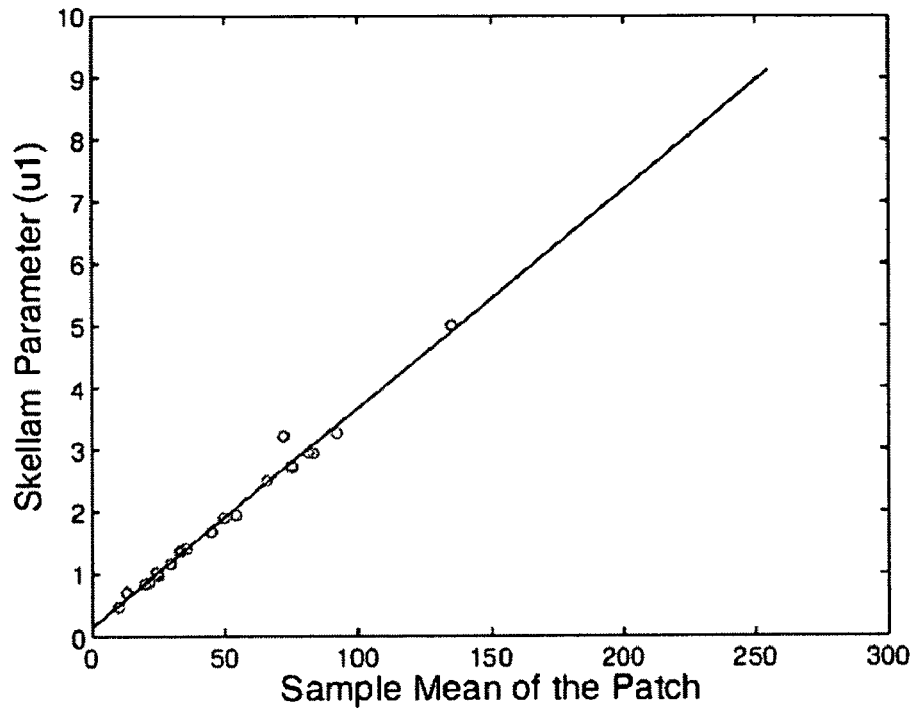
[Fig 8]
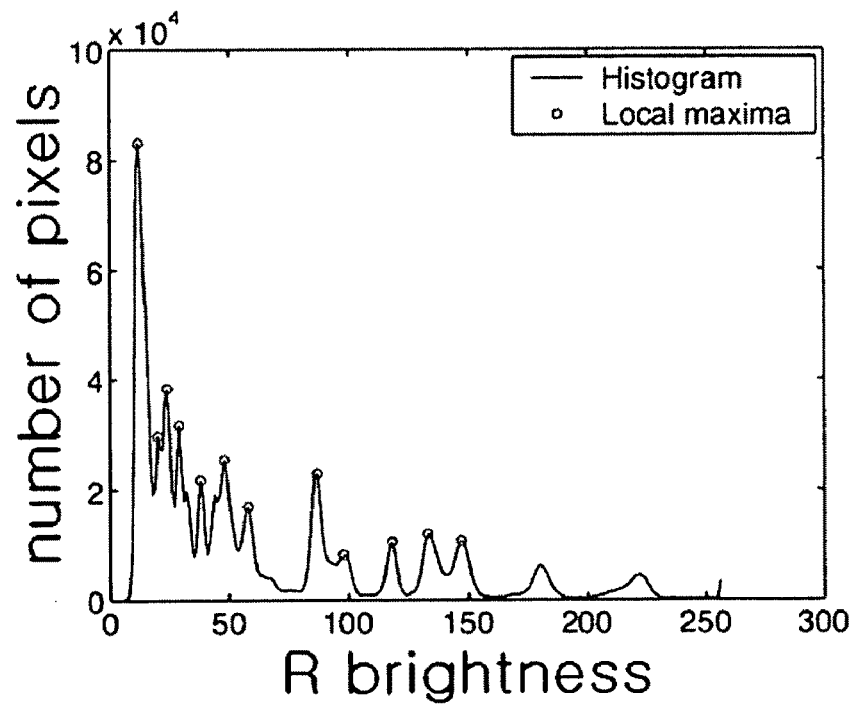

[Fig 9a]
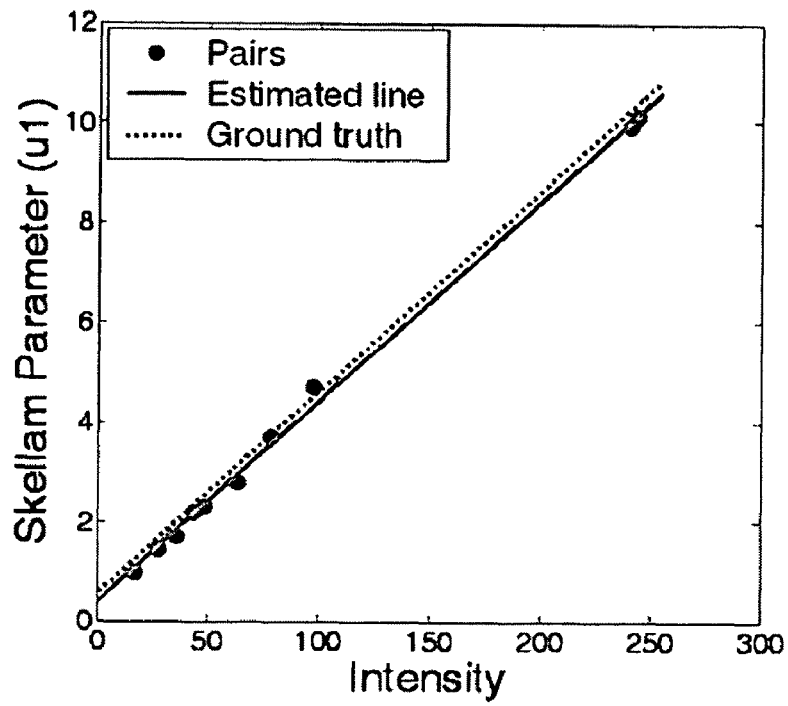
[Fig 9b]
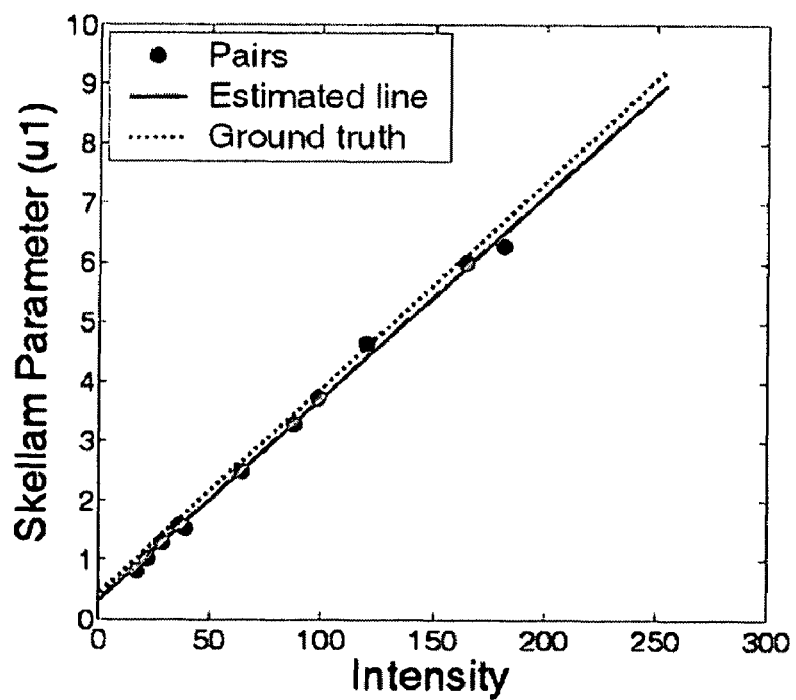

[Fig 9c]
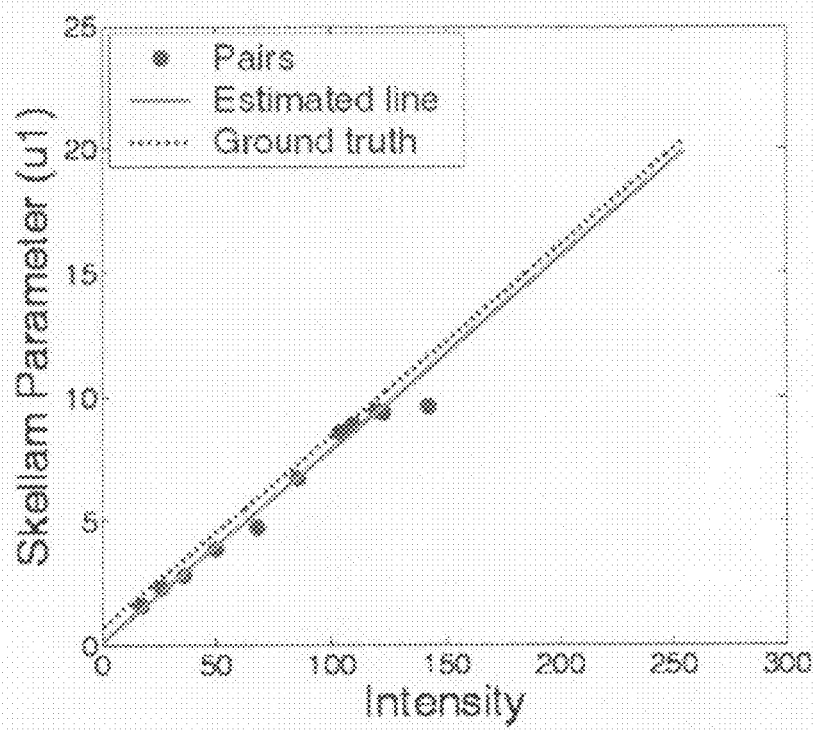
[Fig 10a]
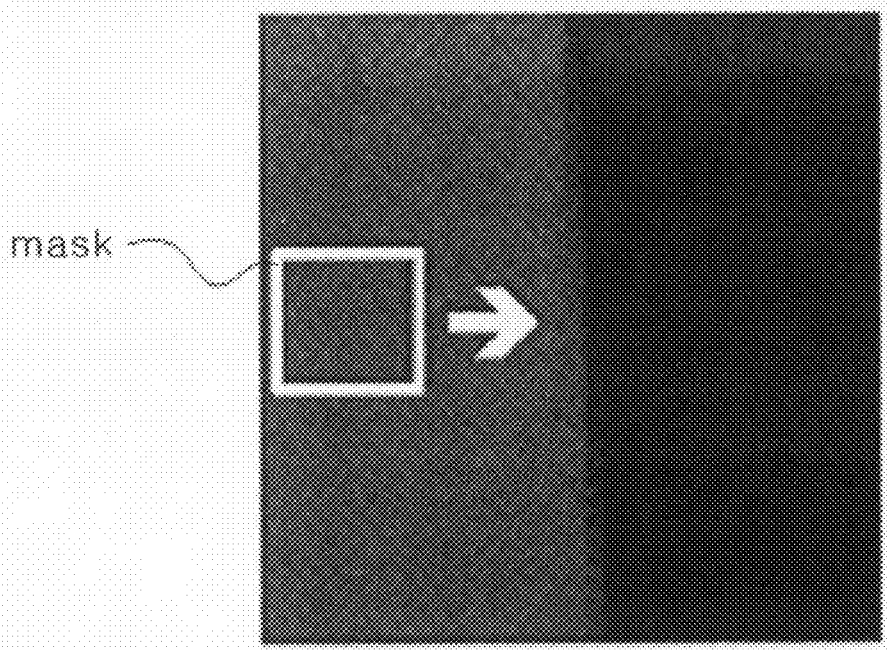

[Fig. 10b]
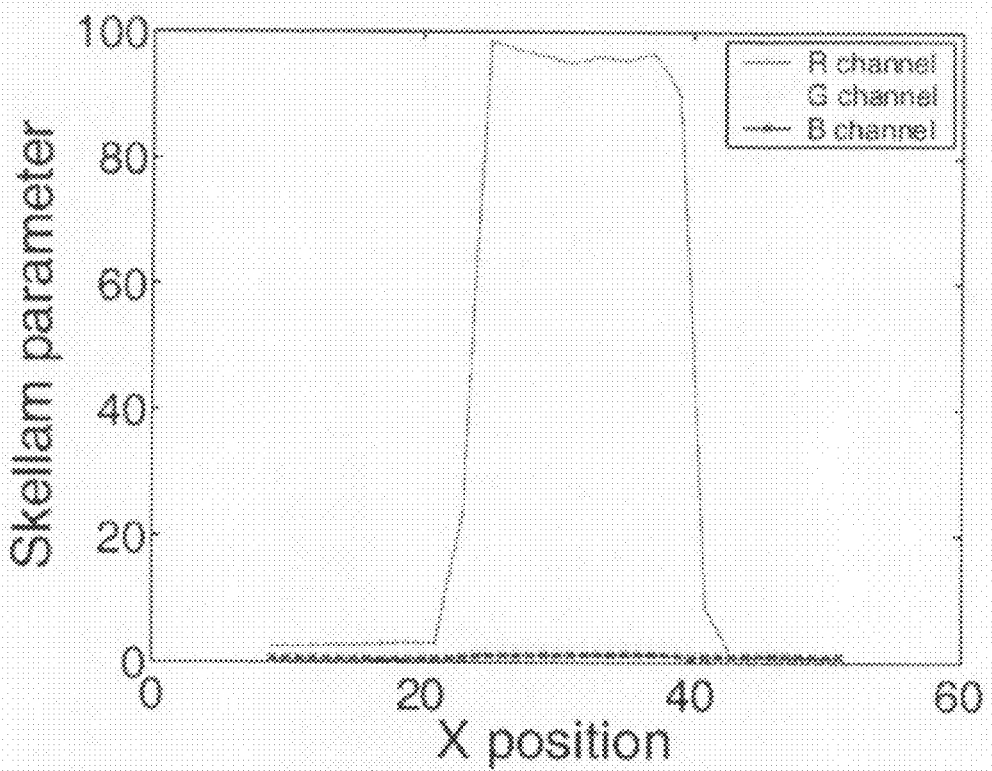
[Fig. 11a]
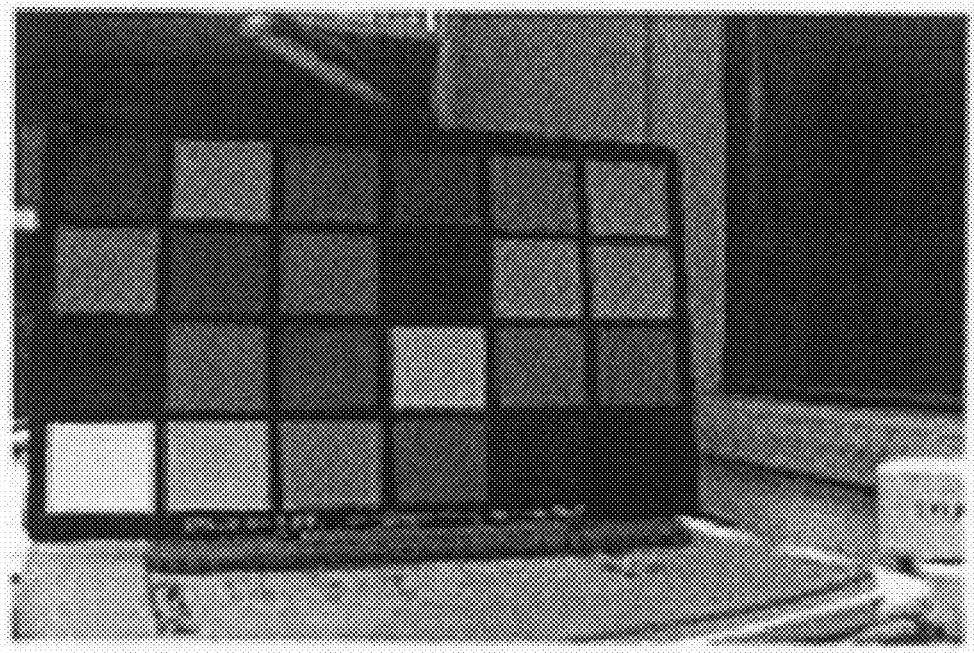

[Fig 11b]
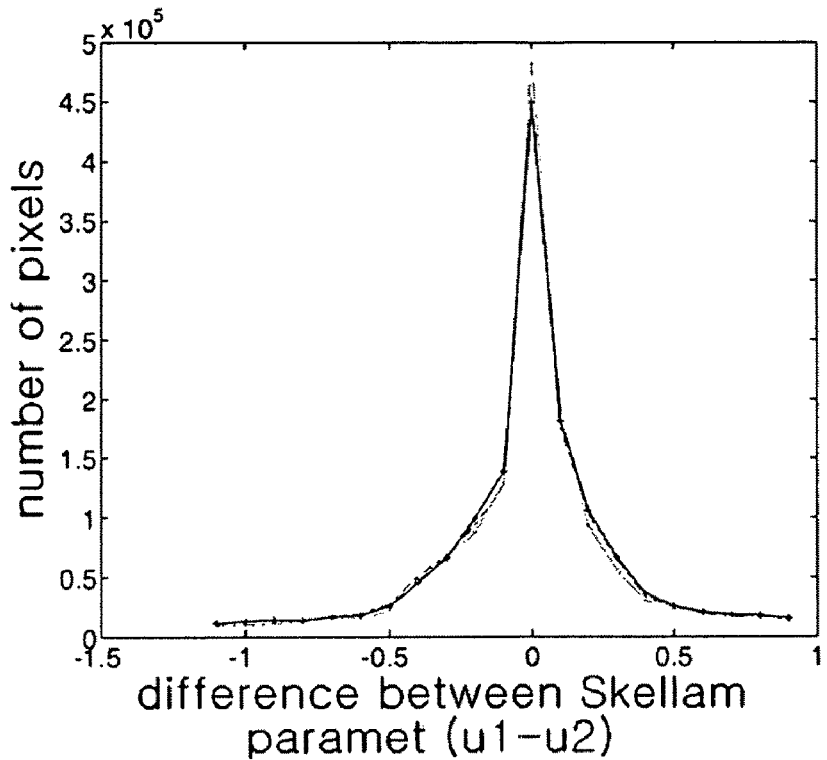
[Fig 12a]
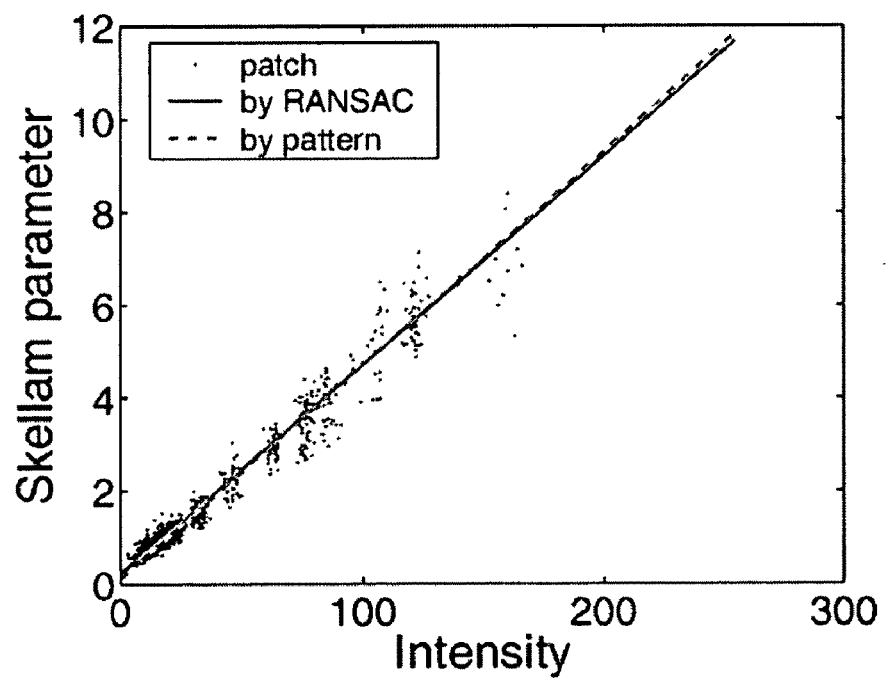

[Fig 12b]
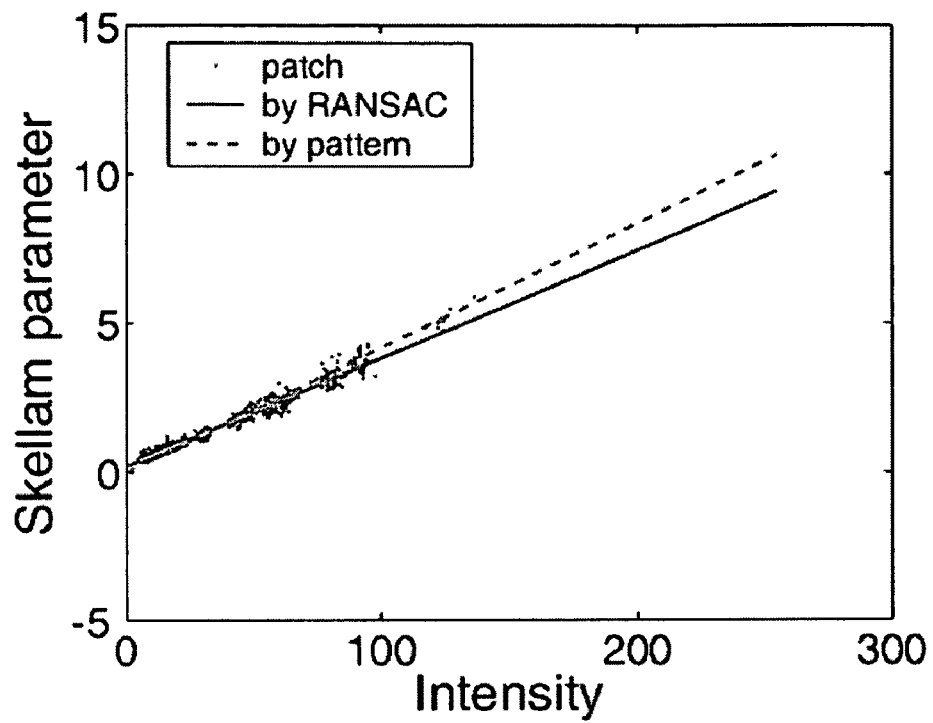
[Fig 12c]
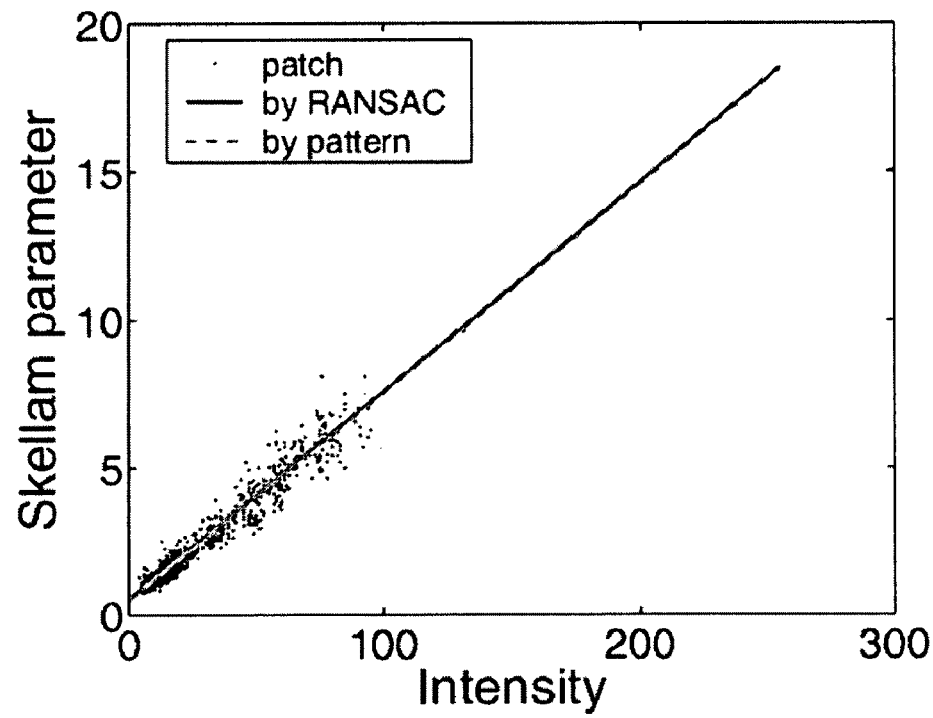

[Fig. 13]
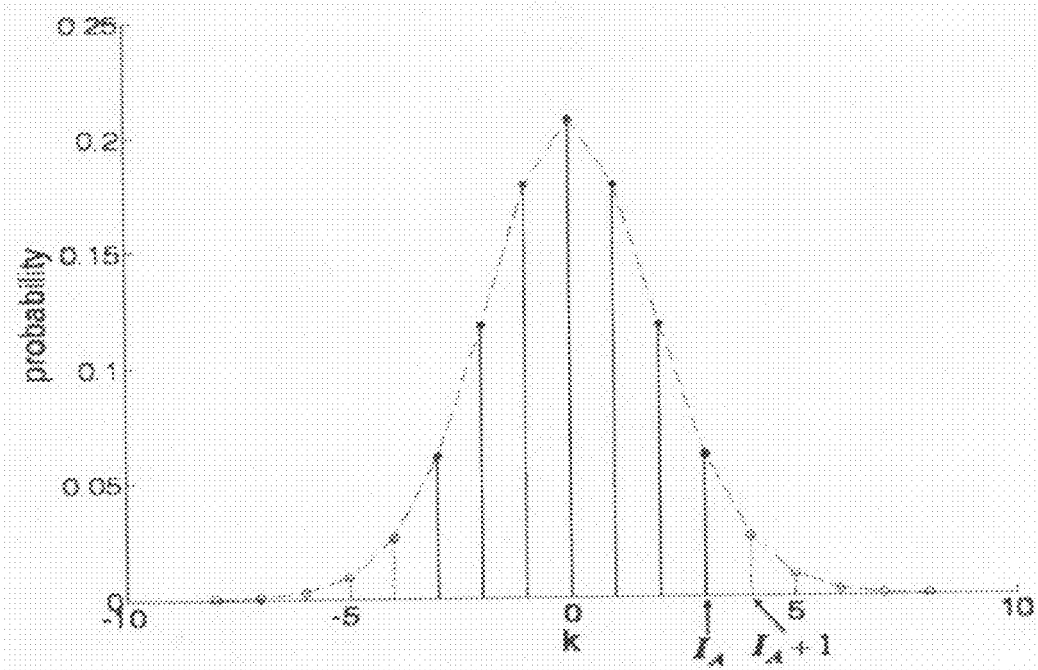
[Fig. 14a]
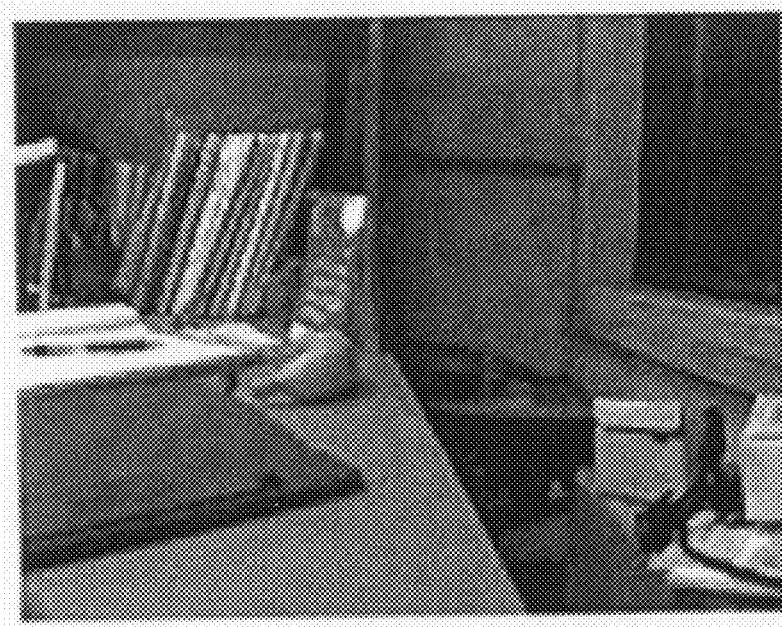
input image

[Fig 14b]
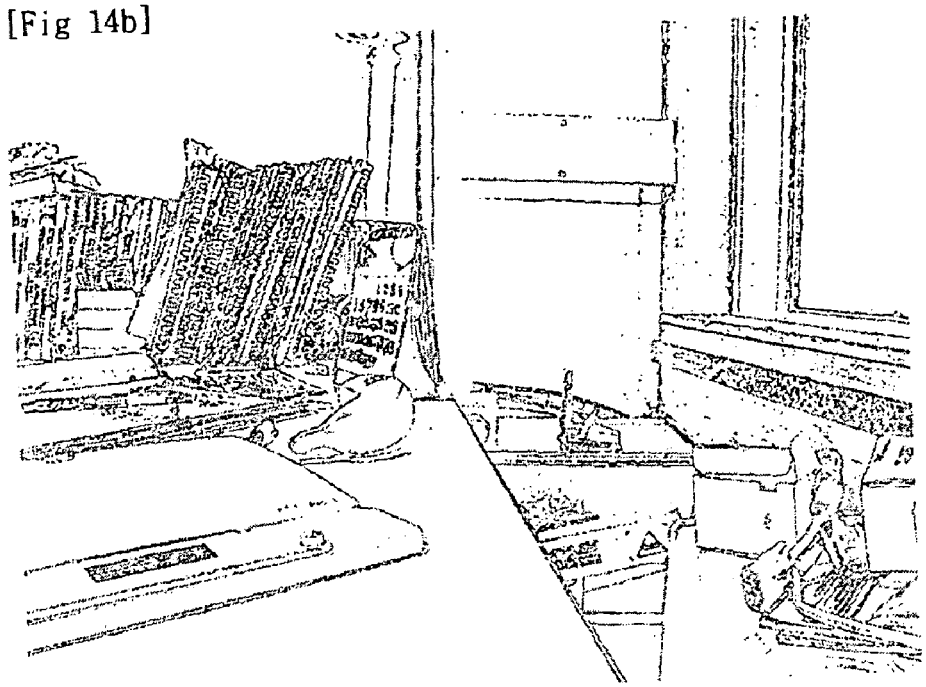
the present invention
(99% confidence interval)
[Fig 14c]
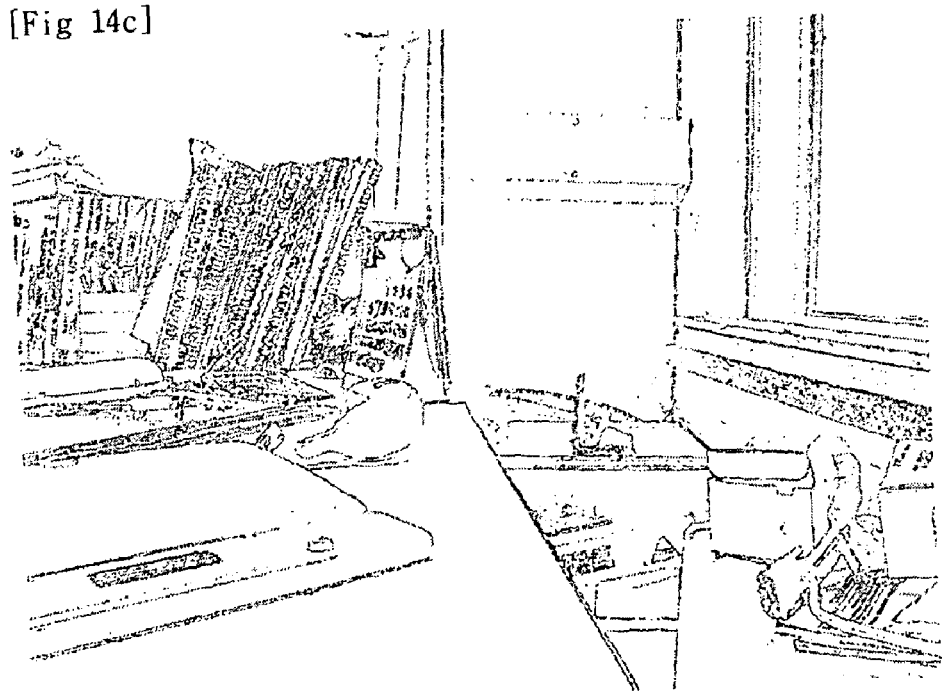
the present invention
(99.9% confidence interval)

[Fig 14d]
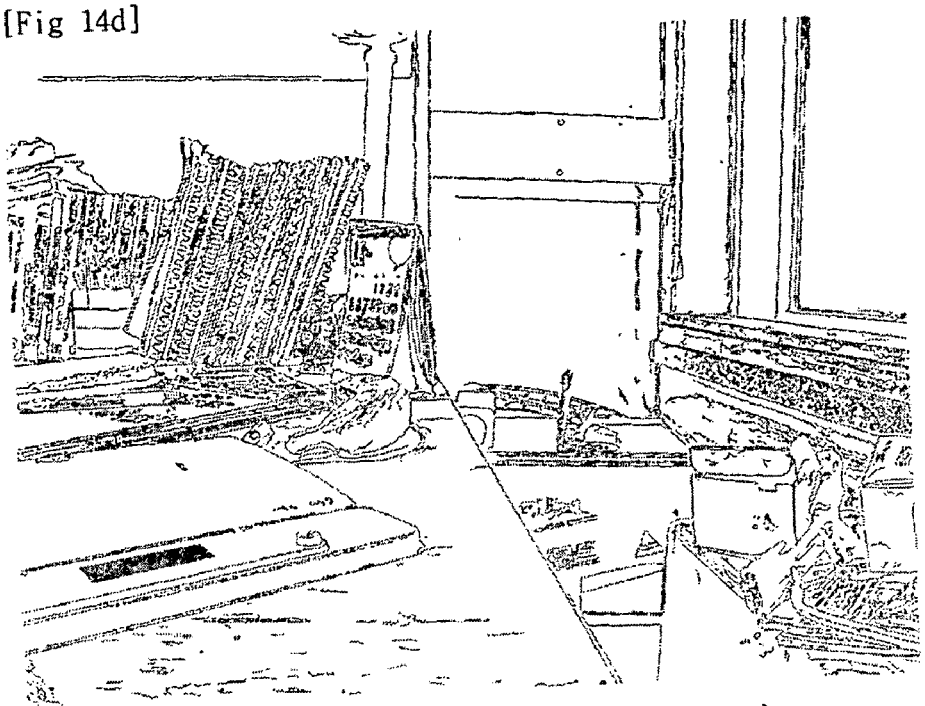
Canny edge (Automatic threshold)
[Fig 14e]
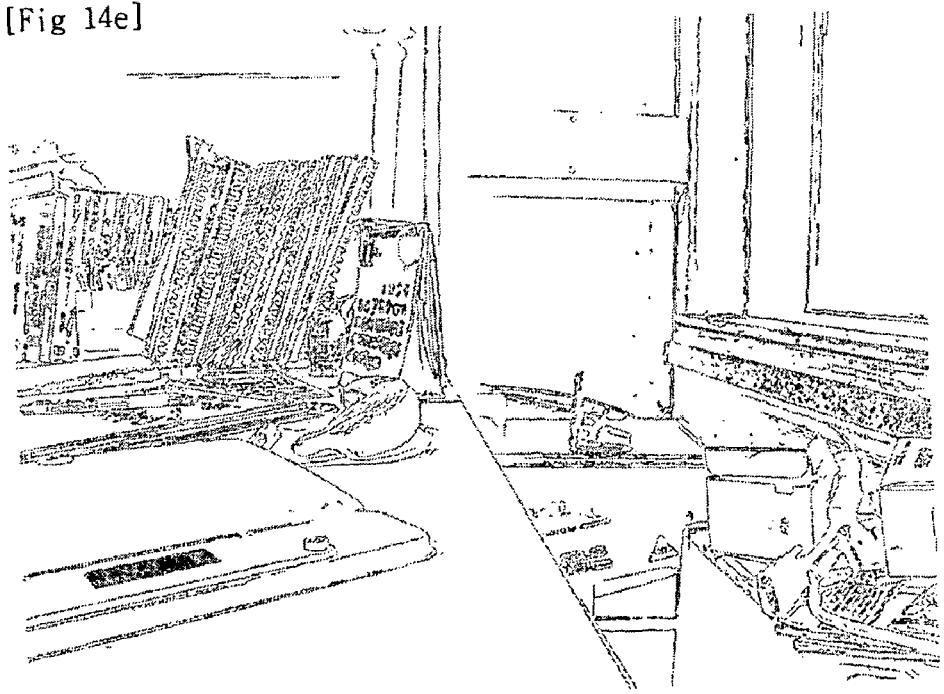
Canny edge (Low threshold)

[Fig 14f]
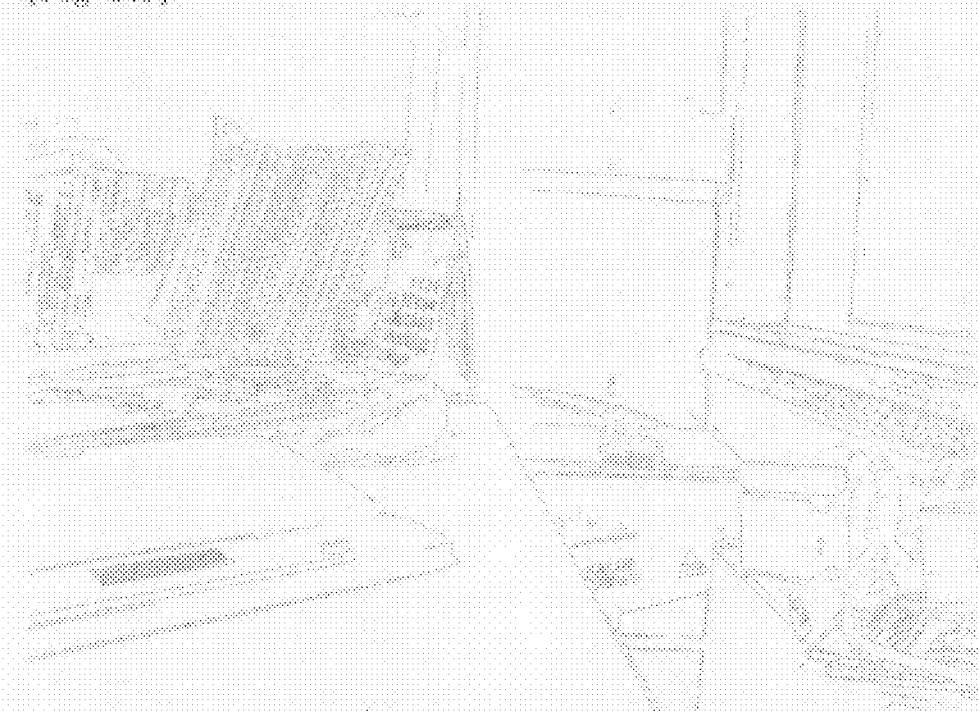
Canny edge(High threshold)
[Fig 15a]
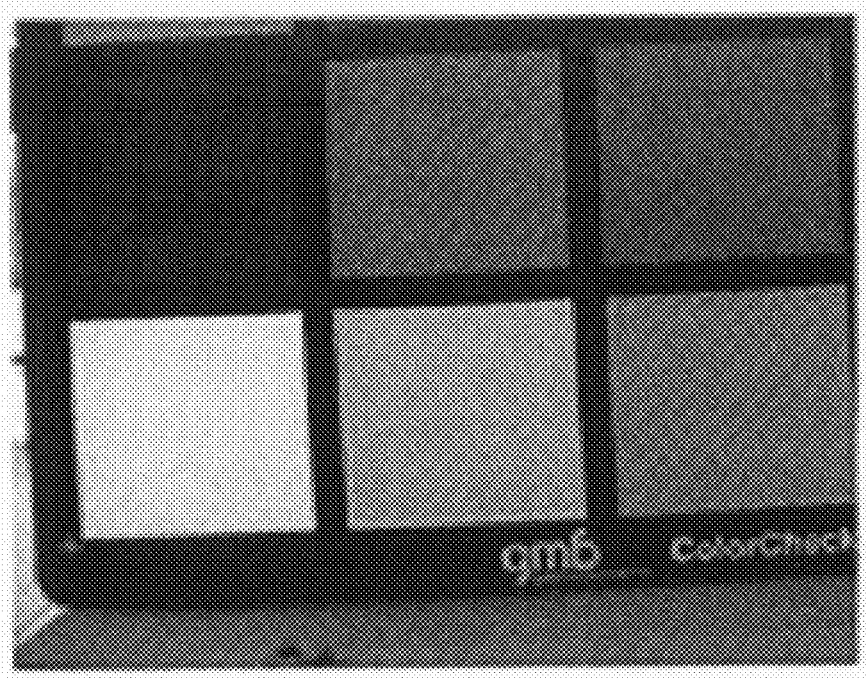
input image

[Fig 15b]
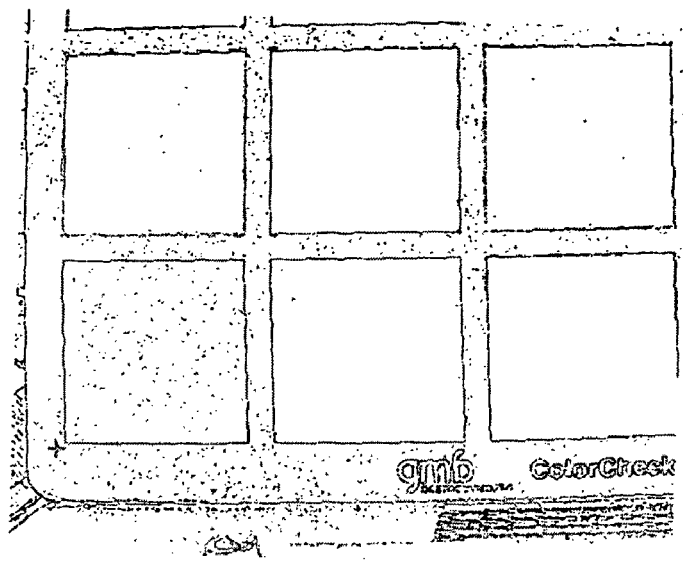
the present inventiom
(99% confidence interval)
[Fig 15c]
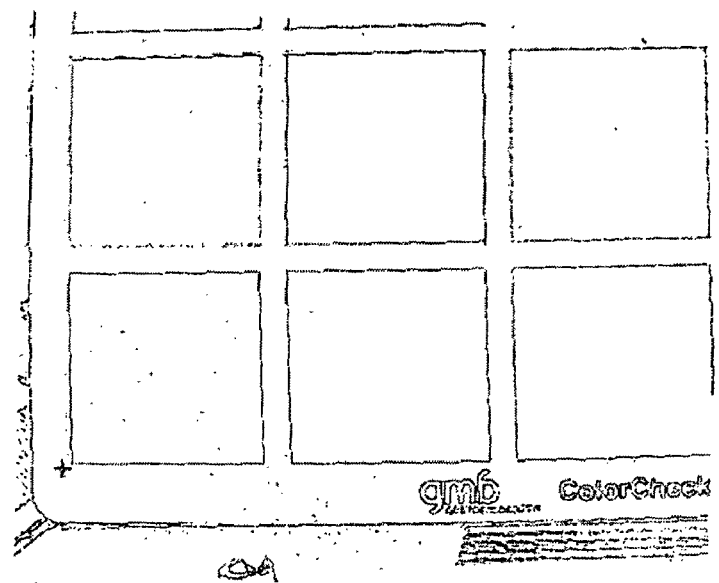
the present invention
(99.9% confidence interval)

[Fig 15d]
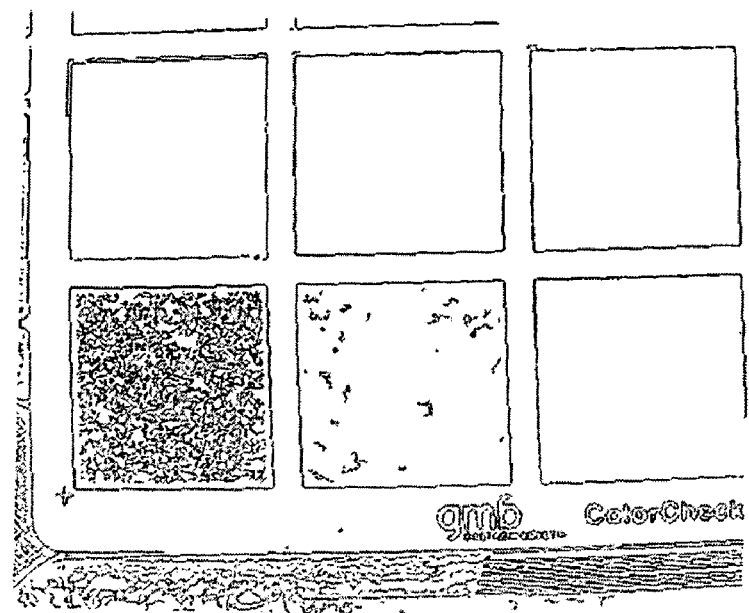
Canny edge(σ=1)
[Fig 15e]
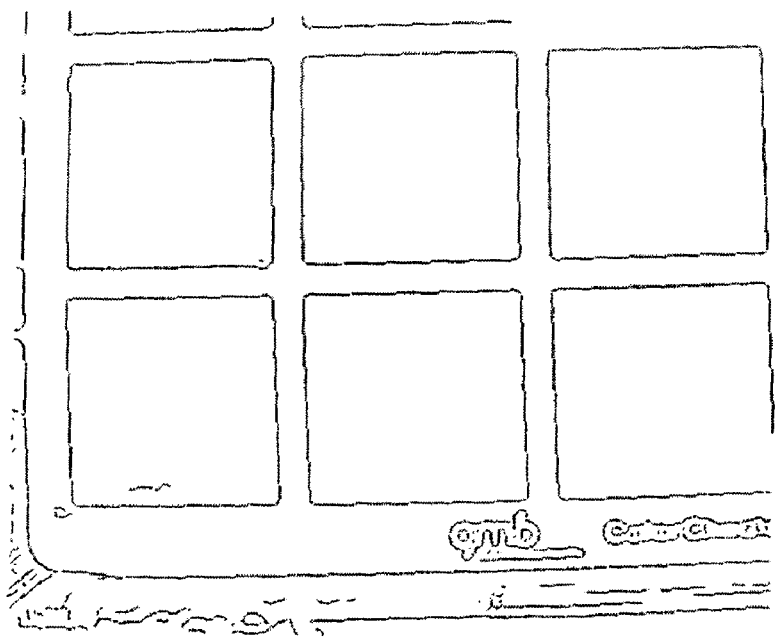
Canny edge(σ=3)

[Fig. 15f]
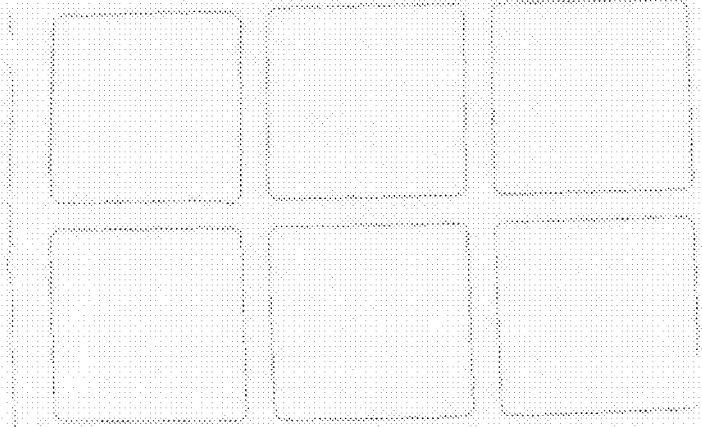
Canny edge( σ =5)
[Fig. 16a]
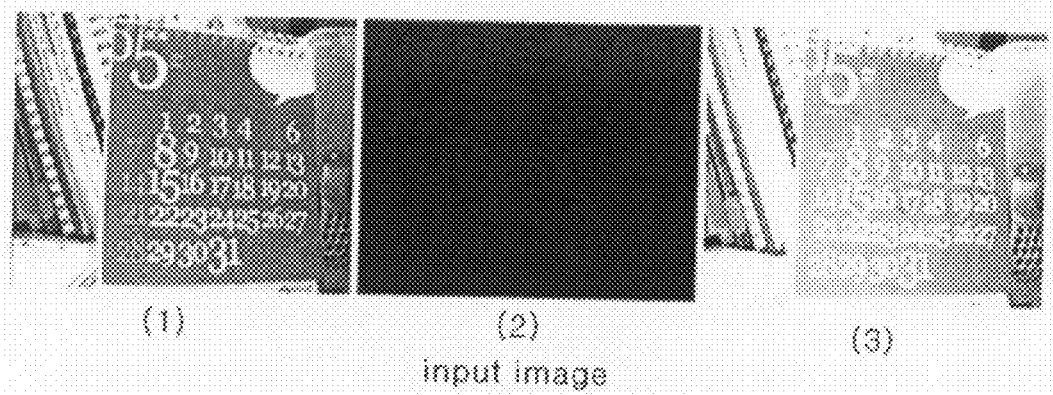
(1)  (2)  (3)
input image

[Fig. 16b]
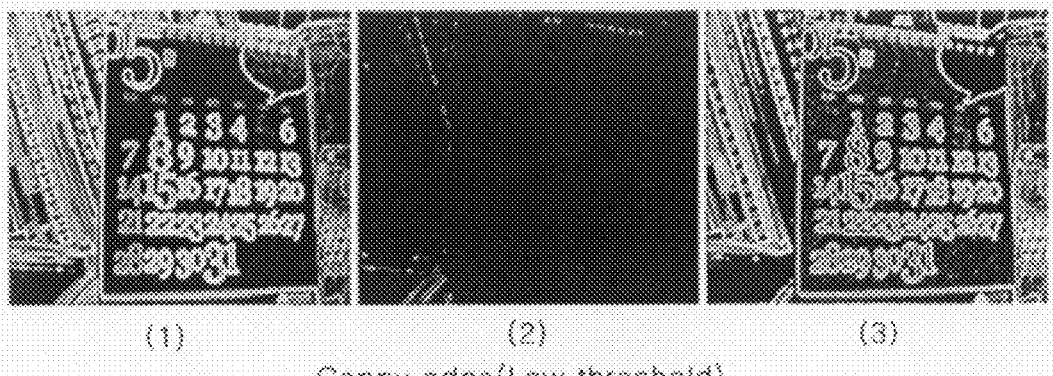
(1)        (2)        (3)
Canny edge(Low threshold)
[Fig. 16c]
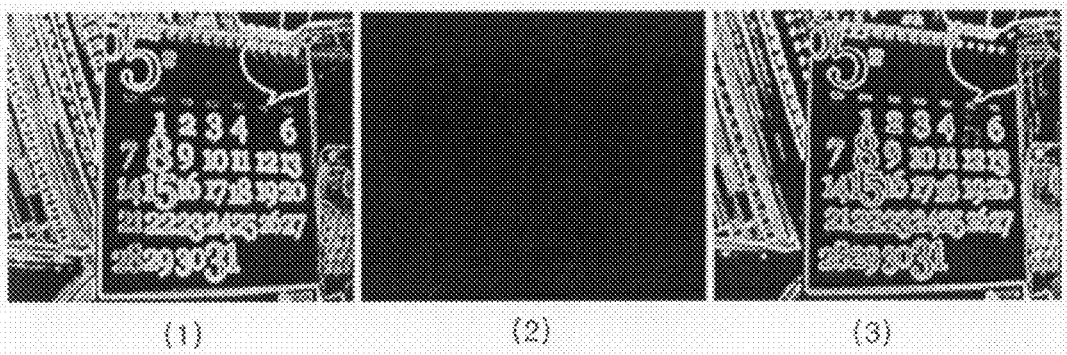
(1)        (2)        (3)
Canny edge(High threshold)
[Fig. 16d]
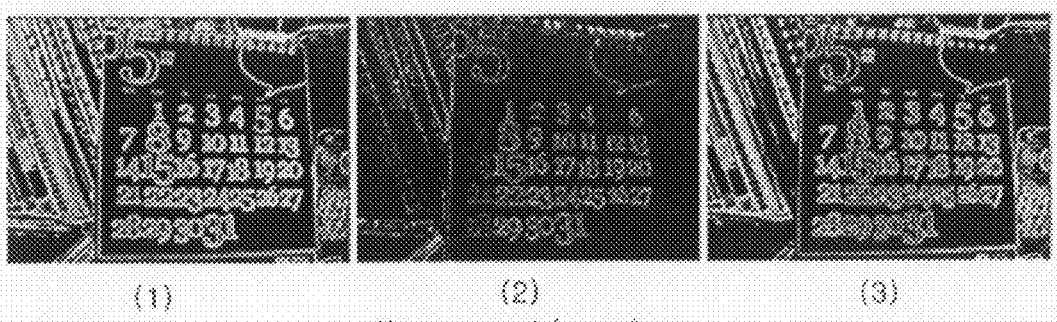
(1)        (2)        (3)
the present invent
(99% confidence interval)

METHOD AND APPARATUS FOR DETECTING EDGE OF IMAGE AND COMPUTER READABLE MEDIUM PROCESSING METHOD

BACKGROUND OF THE INVENTION

1. Field of the Invention

The present invention relates to a method and apparatus for detecting an edge of an object image and a computer readable medium processing the method.

2. Description of the Related Art

A Conventional

In general, a conventional apparatus for detecting an edge of an object performs a smoothing process for an image taken by a camera in order to reduce noises present in the image. In this case, a structure of the smoothed image is varied. That is, position of an edge line of the smoothed image becomes different from position of an actual edge line, especially around a corner. In addition, the conventional image edge detecting apparatus may remove minute variation (minute edge) of the image as well as the noises according to parameters.

The conventional image edge detecting apparatus divides a degree of edge of the image according to values set by a user. For example, the conventional image edge detecting apparatus detects the edge of the image according to image brightness, scene and camera set by the user.

SUMMARY OF THE INVENTION

Accordingly, it is an object of the present invention to provide a method and apparatus for detecting a noise distribution of an image close to a true distribution, and detecting an edge of the image precisely and quickly based on the detected noise distribution without performing a smoothing process for the image, and a computer readable medium processing the method.

To achieve the above object, according to an aspect of the invention, there is provided a method of detecting an edge of an image, including the steps of: detecting a noise distribution of an object image; and detecting an edge of the image based on the detected noise distribution.

According to another aspect of the invention, there is provided an apparatus for detecting an edge of an image, including: a noise detecting unit that detects a noise distribution of an object image; and an edge detecting unit that detects an edge of the image based on the detected noise distribution.

According to still another aspect of the invention, there is provided a computer readable medium recorded with a program for performing the above method.

The medium includes all kinds of record media in which programs and data are stored so that they can be read by a computer system. For example, the medium may include a ROM (Read Only Memory), a RAM (Random Access Memory), a CD (Compact Disk), a DVD (Digital Video Disk)-ROM, a magnetic tape, a floppy disk, an optical data storage, etc., and may be implemented with the form of carrier waves (for example, transmission through the Internet). In addition, the medium may be distributed in computer systems interconnected by a network so that computer readable codes can be stored and executed in a distributed processing system.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIG. 1 is a view showing a configuration of an image edge detecting apparatus according to an embodiment of the present invention;

FIGS. 2a and 2b are views illustrating concept and result of edge detection for explaining an image edge detecting method and apparatus according to an embodiment of the present invention;

FIG. 3 is a view showing an example of a probability mass function of a Skellam distribution;

FIGS. 4a to 4d are views showing Skellam and Gaussian distributions depending on $\mu_1$ and $\mu_1$;

FIGS. 5a to 5c are views showing Skellam parameter estimation results using static images;

FIGS. 6a to 6d are views showing comparison between modeling results in spatial and temporal domains;

FIGS. 7a to 7c are views showing linearity between a sample mean of a patch and a Skellam parameter;

FIG. 8 is a view showing a histogram of intensity in an R channel and detected local maxima;

FIGS. 9a to 9c are views showing estimation results of an Intensity-Skellam line of each channel in two static images;

FIGS. 10a and 10b are views showing variation of a Skellam parameter at an edge line;

FIGS. 11a and 11b are views showing a histogram for a difference between Skellam parameters;

FIGS. 12a to 12c are views showing estimation results of image intensity and a Skellam line in a single image;

FIG. 13 is a view showing intensity allowance of a given probability density function;

FIGS. 14a to 14f are a first exemplary view showing comparison between an edge detection result according to an embodiment of the present invention and an edge detection result of a Canny edge detector;

FIGS. 15a to 15f are a second exemplary view showing comparison between an edge detection result according to an embodiment of the present invention and an edge detection result of a Canny edge detector; and FIGS. 16a to 16d are views showing edge detection results depending on various illumination changes.

DETAILED DESCRIPTION OF THE PREFERRED EMBODIMENT

Hereinafter, preferred embodiments of a method and apparatus for detecting a noise distribution of an image without performing a smoothing process for the image, and detecting an edge of the image precisely and quickly based on the detected noise distribution will be described in detail with reference to the accompanying drawings.

FIG. 1 is a view showing a configuration of an image edge detecting apparatus 10 according to an embodiment of the present invention.

Referring to FIG. 1, the image edge detecting apparatus 10 according to the embodiment of the present invention includes a noise detecting unit 11 that detects a noise distribution in an object image, and an edge detecting unit 12 that detects an edge (or boundary) of the image based on the detected noise distribution. Here, the image edge detecting method and apparatus can be applied to a chare-coupled device (CCD) camera.

The noise detecting unit 11 estimates the noise distribution according to a linear relationship between noise parameters of the image and intensity of the image and outputs the estimated noise distribution to the edge detecting unit 12.

The edge detecting unit 12 detects the edge of the image based on the estimated noise distribution and outputs the detected edge to a display unit 20. At this time, the display unit 20 displays an edge image of the original image on a screen.

Hereinafter, concept and result of edge detection of an object image taken with the CCD camera will be described with reference to FIGS. 2a and 2b.

FIGS. 2a and 2b are views illustrating concept and result of edge detection for explaining an image edge detecting method and apparatus according to an embodiment of the present invention. That is, FIGS. 2a and 2b show general concept and result of edge detection of an image.

As shown in FIGS. 2a and 2b, a noise distribution for each intensity can be determined through linearity between Skellam parameters and a sample mean of a patch, that is intensity, and intensity allowance can be determined based on the determined noise distribution. For example, when the noise distribution depending on intensity at each pixel is determined, it can be determined whether a difference between pixels derives from noise or change of an actual scene based on the determined intensity allowance.

Hereinafter, a Skellam distribution for noise modeling of an intensity difference will be described.

First, assuming that image intensity of each pixel obeys a Poisson distribution, a probability distribution for photon p for an observation time interval T becomes a Poisson distribution according to Equation 1.

$$P(p \mid \rho, T) = \frac{(\rho T)^p e^{-\rho T}}{p!}$$ [Equation 1]

Here, $\rho$ is a ratio of measured photon per second. The mean $\mu$ and the standard deviation $\sigma$ are given as Equations 2 and 3

$$\mu = \rho T$$ [Equation 2]

$$\sigma = \sqrt{\rho T}$$ [Equation 3]

Since the number of photons determines the intensity of pixel. Photon noise is not independent of a signal. In addition, the photon noise is neither Gaussian nor additional. In Equations 2 and 3, $\mu$ means the number of photons for the interval T. It is natural that the number of photons in a bright pixel should be larger than the number of photons in a dark pixel. From this fact, it can be expected that $\mu$ increases with increase of intensity. This expectation will be proved as follows.

If $\mu$ is sufficiently large, the Poisson distribution can be approximated to a Gaussian distribution. Then, since a difference between two Gaussians obeys Gaussian, a distribution of an intensity difference will also be Gaussian. However, $\mu$ is varied depending on intensity. This means that a Gaussian approximation may be broken.

The Poisson distribution is directly used to represent the intensity difference in order to avoid a wrong Gaussian approximation. A difference between two Poisson probability parameters is defined by a Skellam distribution. A probability mass function of the Skellam distribution is a function of k that means the difference between two Poisson probability parameters and is expressed as Equation 4.

$$f(k; \mu_1, \mu_2) = e^{-(\mu_1 + \mu_2)} \left(\frac{\mu_1}{\mu_2}\right)^{k/2} I_k(2\sqrt{\mu_1 \mu_2})$$ [Equation 4]

Here, each of $\mu_1$ and $\mu_2$ refers to the mean or an expected value, and $I_k$ refers to a modified Bessel function of the first kind.

Hereinafter, an example of the probability mass function of the Skellam distribution will be described with reference to FIG. 3.

FIG. 3 is a view showing an example of the probability mass function of the Skellam distribution.

First, in a special case of $\mu_1 = \mu_2$, the Skellam distribution for $\mu$ and k having a large value tends to become a Gaussian distribution. Since $\mu$ and k do not have a sufficiently large value for a pixel having low intensity, the Skellam distribution can not be approximated as the Gaussian distribution. This fact will be described with reference to FIGS. 4a to 4d.

FIGS. 4a to 4d are views showing the Skellam and Gaussian distributions depending on $\mu_1$ and $\mu_2$.

FIG. 4a shows the Skellam and Gaussian distributions when $\mu_1 = \mu_2 = 0.1$ and $\sigma = 0.2$, FIG. 4b shows the Skellam and Gaussian distributions when $\mu_1 = \mu_2 = 0.5$ and $\sigma = 1.0$, FIG. 4c shows the Skellam and Gaussian distributions when $\mu_1 \mu_2 = 1.0$ and $\sigma = 2.0$, and FIG. 4d shows the Skellam and Gaussian distributions when $\mu_1 = \mu_2 = 3.0$ and $\sigma = 6.0$.

Accordingly, Skellam parameters of intensity difference can be easily estimated using statistics of the Skellam distribution. Mean $\mu_s$ and variance $\sigma_s^2$ are given as Equations 5 and 6.

$$\mu_s = \mu_1 - \mu_2$$ [Equation 5]

$$\sigma_s^2 = \mu_1 + \mu_2$$ [Equation 6]

Here, according to Equations 5 and 6, $\mu_1$ and $\mu_2$ can be directly obtained according to Equations 7 and 8.

$$\mu_1 = \frac{\mu_S + \sigma_S^2}{2}$$ [Equation 7]

$$\mu_2 = \frac{\mu_S - \sigma_S^2}{2}$$ [Equation 8]

Here, $\mu_s$ and variance $\sigma_s^2$ can be obtained from an image of a static scene according to Equations 9 and 10.

$$\mu_S = \frac{\sum_t (x_t(i,j) - x_{t+1}(i,j))}{n}$$ [Equaiton 9]

$$\sigma_S^2 = \frac{\sum_t (\mu_S - (x_t(i,j) - x_{t+1}(i,j)))^2}{n}$$ [Equation 10]

Here, $x_t(i,j)$ is intensity of a position (i,j) at a frame t, and n is the total number of images. In order to estimate the Skellam parameters in a variety of colors, 10,000 images are acquired for a static scene of "Gretag-Macbeth ColorChecker." A camera used is "Pointgrey Scorpion." At this time, estimation results (image resolution: 1600×1200, and exposure time: 1/15 second) are as shown in FIGS. 5a to 5c.

FIG. 5a to 5c are views showing Skellam parameter estimation results using 10,000 static images. FIG. 5a shows a Skellam parameter estimation result for a black patch (24th patch), FIG. 5b shows a Skellam parameter estimation result for a gray patch (21st patch), and FIG. 5c shows a Skellam parameter estimation result for a red patch (15th patch).

That is, the Skellam parameters are different for different patches. The black patch has a low Skellam parameter and the gray patch has a high Skellam parameter. This is expected from the fact that $\mu_1$ and $\mu_2$ are the number of photons obtained for acquisition time in the CCD device.

In addition, FIGS. 5a to 5c show different important verification. That is, a distribution of intensity difference can be precisely estimated from a Skellam modeling. This shows that the photon noise assumed in the present invention is appropriately dominant.

As shown in FIGS. 5a to 5c, noise has to be estimated from a single image in order to generalize the Skellam modeling. In the present invention, it is assumed that pixels are independent of each other in a spatial domain. This means that a noise distribution in the spatial domain is equal to that in a temporal domain. In order to prove that this assumption is proper, the noise distribution in the spatial domain is compared with that in the temporal domain. A modeling result in the temporal domain can be obtained according to Equations 9 and 10. Monochromatic color patches are cut out of a color pattern image in order to model noise in the spatial domain. The noise modeling in the spatial domain can be obtained using the cut patches according to Equations 11 and 12.

$$\mu_S = \frac{\sum_{(i,j)\in P} (x_t(i,j) - x_t(i+d_x, j+d_y))}{n} \quad \text{[Equation 11]}$$

$$\sigma_S^2 = \frac{\sum_{(i,j)\in P} (\mu_S - (x_t(i,j) - x_t(i+d_x, j+d_y)))^2}{n} \quad \text{[Equation 12]}$$

Here, (i,j)∈P means all point in the patches, and $d_x$ and $d_y$ mean disparity in horizontal and vertical directions, respectively. n is the total number of pixels in the patches.

Hereinafter, comparison between modeling results in the spatial and temporal domains will be described with reference to FIGS. 6a to 6d.

FIGS. 6a to 6d are views showing comparison between modeling results in the spatial and temporal domains.

FIG. 6a shows comparison between modeling results in the spatial and temporal domains for an orange patch (7th patch), FIG. 6b shows comparison between modeling results in the spatial and temporal domains for a blue patch (13th patch), FIG. 6c shows comparison between modeling results in the spatial and temporal domains for a green patch (14th patch), and FIG. 6d shows comparison between modeling results in the spatial and temporal domains for a medium gray patch (22nd patch). Here, a camera used for the modeling in the spatial and temporal domains is "Pointgrey Scorpion." At this time, estimation results (image resolution: 1600×1200, and exposure time: 1/7.5 second) As shown in FIGS. 6a to 6d, it can be proved that the Skellam parameters in the temporal and spatial domains are nearly equal to each other. This shows that intensity difference is ergodic. If disparity is 1, it can be said that a Skellam parameter is smaller than different estimation results. This seems to occur from compression of pixel values. In a test using a camera having a non-compression RGB output function such as HITACHI HV-F22, it is confirmed that this phenomenon does not occur. A small difference between modeling results in the spatial and temporal domains occurs because only one pixel in the patch is selected when the noise distribution in the temporal domain is estimated. A small variation of the Skellam parameters may occur depending on which pixel in the patch is selected. This experiment shows that disparity in the horizontal and vertical directions has the same result although $d_x$ increases from 1 to 10. Since the suggested modeling system satisfies ergodicity, this system can be applied to a single image.

Hereinafter, a method of estimating noise statistics using the Skellam parameters will be described.

First, although the Skellam modeling can be applied to the spatial domain as well as the temporal domain, linearity between image intensity and the Skellam parameters is used to find precise Skellam parameters.

FIGS. 7a to 7c are views showing linearity between the sample mean of a patch and a Skellam parameter. That is, in the present invention, a noise distribution of an image is estimated based on a linear relationship between the Skellam parameter and intensity of the image.

FIG. 7a shows a linearity relationship between a Skellam parameter of an image for a red (R) channel and image intensity, FIG. 7b shows a linearity relationship between a Skellam parameter of an image for a green (G) channel and image intensity, and FIG. 7c shows a linearity relationship between a Skellam parameter of an image for a blue (B) channel and image intensity. Here, since it is difficult to extract meaningful statistics of mean and variance from a single pixel, 10,000 pattern images are acquired in order to show a correlation between the image intensity and the Skellam parameter.

FIGS. 7a to 7c show Skellam parameter scatter plots related to a sample mean of pixels at positions defined in patches and the linearity relationship between the sample mean and the Skellam parameter. In the figures, a line corresponding to the linearity relationship between the sample mean and the Skellam parameter is called an intensity-Skellam line. If a pixel value can be approximated to the sample mean and has the intensity-Skellam line, the Skellam parameter can be estimated. Straight lines in FIGS. 7a to 7c are varied only depending on an amplitude gain of a camera, not scene and illumination. In addition, once the intensity-Skellam line is determined, these straight lines can be used as long as the amplitude gain is fixed.

Hereinafter, a method of estimating the intensity-Skellam line in two given static images will be described.

First, if the two static images have pairs of Skellam parameters and intensity values, a line matching these pairs can be obtained. If Skellam parameters of particular pixels in the temporal domain are to be obtained, at least 10,000 static images are required to sufficiently stabilize statistics to be calculated. However, it is unpractical to acquire so many static images in indoor and outdoor environments. The present invention provides an intensity-Skellam line estimating method which is capable of reducing the number of required static images to two, which is even more practical than the case where 10,000 static images are acquired. Assuming that pixels in pixels are independent of each other, intensity differences between corresponding pixels in two images can be regarded as a set of intensity differences in the temporal domain. Therefore, the number of pixels used to estimate Skellam parameters at specified intensity is sufficiently large. A line estimation algorithm for one channel is as follows.

1. A histogram of intensity in a first frame is obtained and local maxima are found in the histogram. $x_m^1, m = 0, 1, \ldots, M$ 2. A set of corresponding pixels of two frames satisfying Equation 13 near the local maxima is found.

$$X_m = \{x^1(i,j), x^2(i,j) | x_m - \epsilon < x^1(i,j) < x_m + \epsilon\} \quad \text{[Equation 13]}$$

3. Mean and variance of a set Skellam distribution for $X_m$ are calculated from Equations 14 and 15.

$$\mu_S \mid X_m = \frac{\sum_{X_m}(x_k^1(i,j) - x_k^2(i,j))}{n}$$ [Equation 14]

$$\sigma_S^2 \mid X_m = \frac{\sum_{X_m}(\mu_S \mid X_m - (x_k^1(i,j) - x_k^2(i,j)))}{n}$$ [Equation 15]

4. Skellam parameters, $\mu_1$ and $\mu_2$ are calculated from Equations 7 and 8.

5. Two lines for a pair of $(X_m^1, \mu_1)$ and $(X_m^1, \mu_2)$ are estimated using a general RANSAC (RANdom SAmple Consensus) method.

Two actual color pattern images are acquired and an experiment for the line estimation algorithm is conducted. The acquisition of two color pattern images is for obtaining intensity-Skellam lines close to actual values (ground truth) from a great number of static images and comparing the obtained intensity-Skellam lines.

Hereinafter, a histogram of intensity in the R channel and detected local maxima will be described with reference to FIG. 8.

FIG. 8 is a view showing the histogram of intensity in the R channel and the detected local maxima.

As shown in FIG. 8, pair of intensity and Skellam parameters can be obtained from the local maxima. Here, $\epsilon$ is defined to be 1. In addition, an intensity-Skellam line is determined through RANSAC.

Hereinafter, an estimation result of the intensity-Skellam line in the temporal domain is will be described with reference to FIGS. 9a to 9c.

FIGS. 9a to 9c are views showing estimation results of an Intensity-Skellam line in each channel.

FIG. 9a shows an estimation result of an intensity-Skellam line in the R channel, FIG. 9b shows an estimation result of an intensity-Skellam line in the G channel, and FIG. 9c shows an estimation result of an intensity-Skellam line in the B channel. Here, Straight lines obtained from 10,000 static images are plotted for comparison between the intensity-Skellam lines. That is, the estimated intensity-Skellam lines show highly precise results as compared to actual values. Since most of the pairs of intensity and Skellam parameters used to obtain the intensity-Skellam lines are near the estimated intensity-Skellam lines, the intensity-Skellam lines can be obtained using a small number of pairs of intensity and Skellam parameters.

Hereinafter, a method of estimating an intensity-Skellam line in a single image will be described.

At least two static images are required to estimate the intensity-Skellam line. There are fields using a single image, such as feature point extraction and image segmentation, in a computer vision. Samples in the spatial domain instead of the temporal domain can be collected based on the ergodic characteristics. If patches having a monochromatic color are to be found, a Skellam parameter corresponding to the sample mean can be calculated.

In addition, in the present invention, proper patches are found using characteristics of Skellam parameters. The Skellam mean is calculated as the mean of intensity differences of neighborhood pixels, as expressed by Equation 11. If a color changing portion exists among the neighborhood pixels, it causes variation of the Skellam mean, which will be described with reference to FIGS. 10 and 10b.

FIGS. 10a and 10b are views showing variation of a Skellam parameter at an edge line.

As shown in FIGS. 10a and 10b, an experiment with red-black changing patch is conducted to show variation of the Skellam parameter at the edge line. That is, when a portion of the patch is changed as the patch moves to the right (on an X position), the Skellam parameter increases.

If an image is acquired under directional illumination conditions, the Skellam mean at the patch may be shifted little by little even when the image has a monochromatic color. A histogram of the Skellam mean is first obtained to consider such shift. The highest point in the histogram of the Skellam mean is used to consider the shift of the Skellam mean. Although the illumination is located in the upper direction, the Skellam mean is little shifted on the experiment.

FIGS. 11a and 11b are views showing a histogram for a difference between Skellam parameters. FIG. 11b shows a histogram of the Skellam mean for an input image of FIG. 11a.

As shown in FIGS. 11a and 11b, the highest point can be easily found and patches having the Skellam mean near the highest point are used. Pairs of patch intensity and Skellam parameters are not laid on a single straight line. In addition, there may exist singular points not filtered. In the present invention, a simple RANSAC Algorithm is applied to estimate a straight line. Since lots of patches are distributed on the center, the straight line can be easily found. Accordingly, patches are randomly selected to save time. 1000 19×19 patches are used.

FIGS. 12a to 12c are views showing estimation results of image intensity and a Skellam line in a single image. A noise modeling suggested based on the estimation results can be applied to the single image.

Hereinafter, a method of determining intensity allowance will be described.

Since image intensity values have respective Skellam parameters, image intensity has a precise distribution according to the Skellam parameters. Allowance of intensity variation occurring due to sensor noise can be determined based on this distribution. A method of determining the intensity allowance is to verify a hypothesis for a given confidence interval.

A cumulative distribution function has to be used to verify the hypothesis. Since the probability mass function of the Skellam distribution is defined for only an integer, the cumulative distribution function can be calculated as Equation 16.

$$F(K; \mu_1, \mu_2) = \sum_{k=-\infty}^{K} e^{-(\mu_1+\mu_2)}\left(\frac{\mu_1}{\mu_2}\right)^{k/2} I_k(2\sqrt{\mu_1\mu_2})$$ [Equation 16]

An acceptance region for critical value I is expressed as Equation 17.

$$A(I) = \{v \mid v < I\} = F(I; \mu_1, \mu_2) - F(-I; \mu_1, \mu_2)$$ [Equation 17]

Intensity allowance $I_A$ is determined according to Equation 18.

$$I_A = \underset{i}{\operatorname{argmax}} A(I) \text{ s.t. } A(I) \leq 1 - \alpha$$ [Equation 18]

Here, $\alpha$ is a size of I type error meaning a true rejection rate to give a confidence interval of $(1-\alpha)*100\%$, as shown in FIG. 13.

FIG. 13 is a view showing intensity allowance of a given probability density function. Here, 1−α represents the sum of length of solid lines and α represents the sum of length of dashed lines.

Hereinafter, a method of applying the noise modeling to edge detection will be described.

First, the suggested noise modeling is applied to edge detection by directly using the intensity allowance. Although a general image edge detecting method and apparatus smoothes an image as a pre-process through a Gaussian kernel, the edge detecting method and apparatus based on the noise modeling according to the embodiment of the present invention need not smooth an image since variation of image intensity due to sensor noises can be precisely known. The edge detecting method and apparatus based on the noise modeling according to the embodiment of the present invention alleviates noises in an image as well as finding a detailed edge instead of Gaussian smoothing.

Hereinafter, a method of detecting an edge in an image and a post-process will be described.

Since the intensity allowance can be precisely determined based on the noise estimation using the Skellam distribution, an edge in the image can be simply detected. That is, the method of detecting the edge in the image is highly similar to a method of detecting variations in the image. For example, if an intensity difference between two adjacent pixels falls within the intensity allowance, the edge detecting unit 12 of FIG. 1 determines that there is no edge in the image, or otherwise, there are variations of color in a true scene, and the edge detecting unit 12 determines that there is any edge in the image. A degree of edge in the horizontal and vertical directions is defined according to Equations 19 and 20.

$$e_x^c(i, j) = \frac{|x^c(i-1, j) - x^c(i+1, j)| - I_A}{I_A} \quad \text{[Equation 19]}$$

$$e_y^c(i, j) = \frac{|x^c(i, j-1) - x^c(i, j+1)| - I_A}{I_A} \quad \text{[Equation 20]}$$

Here, $I_A$ means intensity allowance in a pixel, c means red, green and blue color channels in an RGB color space, and x(i,j) means a pixel value at a position (i,j) of an image. The degree of edge is defined by measuring a normalized distance of image intensity from the intensity allowance. If degrees of edges are negative in both of the horizontal and vertical directions, a pixel concerned is regarded as a pixel having no edge, or otherwise, degrees of edges in both of the horizontal and vertical directions are summed. As a result, the total degree of edges in one pixel is expressed by Equation 21.

$$e(i, j) = \quad \text{[Equation 21]}$$
$$\begin{cases} 0, & \text{if } \begin{cases} e_x^c(i, j) < 0 \\ e_y^c(i, j) < 0 \end{cases} \text{for all } c \\ \sum_c e_x^c(i, j) + \sum_c e_y^c(i, j), & \text{otherwise} \end{cases}$$

The total degree of edges is preveniently reduced to a degree of edge due to sensor noise.

After the degree of edge is calculated for all pixels, a non-maximum suppression process is performed since a true edge does not appear as a single straight line. A Canny edge, which is most frequently used, requires two values for hysteresis classification in order to interconnect edges after the non-maximum suppression. However, in the present invention, since the intensity difference falls outside the intensity allowance determined based on the noise distribution, a degree of edge which is not zero regards a pixel concerned as an edge pixel.

Hereinafter, an image edge detection result according to an embodiment of the present invention will be described with reference to FIGS. 15a to 15f.

FIGS. 14a to 14f are a first exemplary view showing comparison between an image edge detection result according to an embodiment of the present invention and an image edge detection result of a Canny edge detector. An image edge detecting apparatus according to an embodiment of the present invention is compared with a Canny edge detector provided in MATLAB. Here, the image edge detecting apparatus according to the embodiment of the present invention has only one parameter of a confidence interval.

As shown in FIGS. 14a to 14f, Canny edge detectors have three parameters of high and low critical values for scale of Gaussian smoothing and hysteresis connection, respectively. These critical values are very susceptible in some cases and have a great effect on performance of the apparatus. Three results are given as automatic, high and low critical (or threshold) values with scale of the Gaussian smoothing fixed. The image edge detecting apparatus of this invention shows performance superior to that of the three Canny edge detectors. The image edge detecting apparatus of this invention alleviates most of wrongly detected edges as compared to the results of the low and automatic critical values in the Canny edge detectors. In addition, the image edge detecting apparatus of this invention shows details similar to the result of the low critical value. This is possible because pixels determine critical values differently based on the estimated noise distribution.

FIGS. 15a to 15f are a second exemplary view showing comparison between an edge detection result according to an embodiment of the present invention and an edge detection result of a Canny edge detector.

FIGS. 15a to 15f show edge detection results when scale of Gaussian smoothing is varied in the Canny edge detector. Canny critical values are automatically selected in MATLAB. Position estimation is very well conserved in the edge detecting apparatus, but in the Canny edge detector, the position estimation is not properly made by smoothing of a scale so sufficiently high as to alleviate unexpected edges due to image noises.

Hereinafter, edge detection results depending on various illumination changes will be described with reference to FIGS. 16a to 16d.

FIGS. 16a to 16d are views showing edge detection results depending on various illumination changes.

As shown in FIGS. 16a to 16d, edge detection results in the Canny edge detector and the edge detecting apparatus of this invention show a normalized degree of edge. For a dark input image, the Canny edge detector can not find a minute edge even if the Canny edge has a low critical value, but the edge detecting apparatus of this invention can find a fine edge. For a bright input image, repeated edges similar to edges in an image of ordinary illumination can be obtained in the edge detecting apparatus of this invention. However, the Canny edge detector can not alleviate wrong alarm occurring in a portion of monochromatic color. Accordingly, the image edge detecting method and apparatus according to the embodiment of the present invention shows high repetition performance for various illumination variations.

As apparent from the above description, the present invention provides an image edge detecting method and apparatus which shows excellent performance in an automated system, as compared to conventional edge detecting method and apparatuses, and a computer readable medium processing the method. The biggest problem in applying the conventional edge detecting methods and apparatuses to industrial systems is that users have to correct parameters of edge detection according to variations of scenes or illuminations. However, the edge detecting method and apparatus according to the embodiment of the present invention show robust results even under such variations, as shown in FIGS. 16a to 16d, as compared to the conventional edge detecting methods and apparatuses. For example, the edge detecting method and apparatus according to the embodiment of the present invention can know a structure of a scene of an image so dark as not to be perceived by persons and effectively remove noises even for an image so bright as not to be removed by the conventional edge detecting methods and apparatuses.

In addition, the conventional edge detecting methods and apparatuses have a problem in that image edges have a curved shape, not an actual sharp straight line shape, according to a level of smoothing. However, since the edge detecting method and apparatus according to the embodiment of the present invention does not require a smoothing process, this edge detecting method and apparatus can precisely detect image edges, and thus, can be effectively used to develop systems for discovering a precise structure of a scene of an image.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A method of detecting an edge of an image, comprising the steps of:
   detecting a noise distribution of an object image by estimating the noise distribution according to correlation between noise parameters of the image and intensity of the image, the noise parameters being Skellam parameters detected from pairs of Skellam parameters and intensity of a set of same pixels having the same intensity of two static images; and
   detecting an edge of the image based on the detected noise distribution.

2. The method according to claim 1, wherein the step of detecting the edge comprises determining that there is no edge in the image if an intensity difference between adjacent pixels of the image falls within intensity allowance, and determining that there is any edge in the image if the intensity difference between adjacent. pixels of the image does not fall within the intensity allowance.

3. The method according to claim 1, wherein the noise parameters are Skellam parameters detected from patches having uniform color in the image using an ergodic characteristic of a Skellam distribution of the image.

4. The method according to claim 1, wherein the noise parameters are Skellam parameters detected for RGB (Red, Green and Blue) pixels of the image based on linearity between the noise parameters of the image and the intensity of the image.

5. The method according to claim 1, wherein the noise parameters are Skellam parameters detected for RGB (Red, Green and Blue) pixels of the image based on a detected relationship between the noise parameters of the image and the intensity of the image.

6. A method of detecting an edge of an image, comprising the steps of:
   detecting a noise distribution of an object image; and
   detecting an edge of the image based on the detected noise distribution,
   wherein a degree of edge (e(i,j)) for one pixel of the image is calculated according to the following equations, $$e(i, j) = \begin{cases} 0, & \text{if } \begin{cases} e_x^c(i, j) < 0 \\ e_y^c(i, j) < 0 \end{cases} \text{ for all } c \\ \sum_c e_x^c(i, j) + \sum_c e_y^c(i, j), & \text{otherwise,} \end{cases}$$

$$e_x^c(i, j) = \frac{|x^c(i-1, j) - x^c(i+1, j)| - I_A}{I_A}, \text{ and}$$

$$e_y^c(i, j) = \frac{|x^c(i, j-1) - x^c(i, j+1)| - I_A}{I_A}$$

where, $I_A$ means intensity allowance in a pixel of the image, c means RGB (Red, Green and Blue) color channels in a color space, and x(i,j) means a pixel value at a position (i,j) of the image.

7. A non-transitory computer readable medium recorded with a program for performing the method according to claim 1.

8. An apparatus for detecting an edge of an image, comprising:
   a noise detecting unit that detects a noise distribution of an object image by estimating the noise distribution according to correlation between noise parameters of the image and intensity of the image, the noise parameters being Skellam parameters detected for TGB (Red, Green and Blue) pixels of the image based on a detected relationship between the noise parameters of the image and the intensity of the image; and
   an edge detecting unit that detects an edge of the image based on the detected noise distribution.

9. The apparatus according to claim 8, wherein the edge detecting unit determines that there is no edge in the image if an intensity difference between adjacent pixels of the image falls within intensity allowance, and determines that there is any edge in the image if the intensity difference between adjacent pixels of the image does not fall within the intensity allowance.

10. An apparatus for detecting an edge of an image, comprising:
    a noise detecting unit that detects a noise distribution of an object image by estimating the noise distribution according to correlation between noise parameters of the image and intensity of the image, the noise parameters being Skellam parameters detected from pairs of Skellam parameters and intensity of a set of same pixels having the same intensity of two static images; and
    an edge detecting unit that detects an edge of the image based on the detected noise distribution.

11. An apparatus for detecting an edge of an image, comprising:
    a noise detecting unit that detects a noise distribution of an object image, the noise detecting unit estimating the noise distribution according to correlation between noise parameters of the image and intensity of the image, to the noise parameters being Skellam parameters detected from patches having uniform color in the image using an ergodic characteristic of a Skellam distribution of the image; and
an edge detecting unit that detects an edge of the image based on the detected noise distribution.

12. An apparatus for detecting an edge of an image, comprising:
a noise detecting unit that detects a noise distribution of an object image, the noise detecting unit estimating the noise distribution according to correlation between noise parameters of the image and intensity of the image, the noise parameters being Skellam parameters detected for RGB (Red, Green and Blue) pixels of the image based on linearity between the noise parameters of the image and the intensity of the image; and
an edge detecting unit that detects an edge of the image based on the detected noise distribution.

13. An apparatus for detecting an edge of an image, comprising:
a noise detecting unit that detects a noise distribution of an object image; and
an edge detecting unit that detects an edge of the image based on the detected noise distribution;
wherein a degree of edge (e(i,j)) for one pixel of the image is calculated according to the following equations, $$e(i, j) = \begin{cases} 0, & \text{if } \begin{cases} e_x^c(i, j) < 0 \\ e_y^c(i, j) < 0 \end{cases} \text{for all } c \\ \sum_c e_x^c(i, j) + \sum_c e_y^c(i, j), & \text{otherwise,} \end{cases}$$

$$e_x^c(i, j) = \frac{|x^c(i-1, j) - x^c(i+1, j)| - I_A}{I_A}, \text{ and}$$

$$e_y^c(i, j) = \frac{|x^c(i, j-1) - x^c(i, j+1)| - I_A}{I_A}$$

where, $I_A$ means intensity allowance in a pixel of the image, c means RGB (Red, Green and Blue) color channels in a color space, and x(i,j) means a pixel value at a position (i,j) of the image.

14. The apparatus for detecting an edge of an image, comprising:
a noise detecting unit that detects a noise distribution according to a linear relationship between Skellam parameters and intensity of an object image, the Skellam parameters being detected from patches having uniform color in the object image using an ergodic characteristic of a Skellam distribution of the image, based on the mean and the standard deviation of the Skellam distribution of the image; and
an edge detecting unit that detects the edge of the image by determining that there is no edge in the image if an intensity difference between adjacent pixels of the image falls within intensity allowance and determining that there is any edge in the image if the intensity difference between adjacent pixels of the image does not fall within the intensity allowance, based on the detected noise distribution,
wherein a degree of edge (e(i,j)) for one pixel of the image is calculated according to the following equations, $$e(i, j) = \begin{cases} 0, & \text{if } \begin{cases} e_x^c(i, j) < 0 \\ e_y^c(i, j) < 0 \end{cases} \text{for all } c \\ \sum_c e_x^c(i, j) + \sum_c e_y^c(i, j), & \text{otherwise,} \end{cases}$$

$$e_x^c(i, j) = \frac{|x^c(i-1, j) - x^c(i+1, j)| - I_A}{I_A}, \text{ and}$$

$$e_y^c(i, j) = \frac{|x^c(i, j-1) - x^c(i, j+1)| - I_A}{I_A}$$

where, $I_A$ means intensity allowance in a pixel of the image, c means RGB (Red, Green and Blue) color channels in a color space, and x(i,j) means a pixel value at a position (i,j) of the image.

* * * * *